US009463440B2

(12) United States Patent
Chopra

(10) Patent No.: US 9,463,440 B2
(45) Date of Patent: Oct. 11, 2016

(54) OXIDE-BASED NANOSTRUCTURES AND METHODS FOR THEIR FABRICATION AND USE

(71) Applicant: Board of Trustees of The University of Alabama, Tuscaloosa, AL (US)

(72) Inventor: Nitin Chopra, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 6 days.

(21) Appl. No.: 14/487,887

(22) Filed: Sep. 16, 2014

(65) Prior Publication Data

US 2015/0080208 A1    Mar. 19, 2015

Related U.S. Application Data

(60) Provisional application No. 61/878,366, filed on Sep. 16, 2013.

(51) Int. Cl.
| | |
|---|---|
| *B01J 37/34* | (2006.01) |
| *B01J 23/00* | (2006.01) |
| *B01J 23/70* | (2006.01) |
| *B01J 23/72* | (2006.01) |
| *B01J 23/75* | (2006.01) |
| *B01J 37/08* | (2006.01) |

(Continued)

(52) U.S. Cl.
CPC ............. *B01J 23/75* (2013.01); *B01J 35/002* (2013.01); *B01J 35/004* (2013.01); *B01J 35/06* (2013.01); *B01J 37/08* (2013.01); *B01J 37/34* (2013.01)

(58) Field of Classification Search
CPC ........... B01J 23/72; B01J 23/75; B01J 37/34
USPC .............................. 502/5, 300, 325, 331, 345
See application file for complete search history.

(56) References Cited

U.S. PATENT DOCUMENTS

| | | | | |
|---|---|---|---|---|
| 7,179,561 B2* | 2/2007 | Niu | .................... | H01M 4/8846 |
| | | | | 427/115 |
| 7,560,366 B1* | 7/2009 | Romano | ................ | C30B 11/12 |
| | | | | 257/E51.038 |
| 7,939,218 B2* | 5/2011 | Niu | ......................... | H01B 1/04 |
| | | | | 423/445 R |

(Continued)

FOREIGN PATENT DOCUMENTS

| | | |
|---|---|---|
| WO | 2007/026974 | 3/2007 |
| WO | 2010/025124 | 3/2010 |
| WO | 2010/054357 | 5/2010 |

OTHER PUBLICATIONS

Eymery et al., Nanometric artificial structuring of semiconductor surfaces for crystalline. C. R. Physique, 6:105-116, 2005.

(Continued)

*Primary Examiner* — Cam N. Nguyen
(74) *Attorney, Agent, or Firm* — Meunier Carlin & Curfman LLC

(57) ABSTRACT

Fabrication of oxide nanowire heterostructures with controlled morphology, interface and phase purity are desired for high-efficiency and low-cost photocatalysis. Disclosed herein is the formation of oxide nanowire heterostructures by sputtering and subsequent air annealing to result in oxide nanowires. This approach allows for fabrication of standing nanowire heterostructures with tunable compositions and morphologies.

20 Claims, 24 Drawing Sheets

(51) Int. Cl.
B01J 35/00 (2006.01)
B01J 35/06 (2006.01)

(56) References Cited

U.S. PATENT DOCUMENTS

| | | | | |
|---|---|---|---|---|
| 7,951,422 | B2* | 5/2011 | Pan | B82Y 30/00 427/248.1 |
| 7,977,013 | B2* | 7/2011 | Niu | H01M 4/8846 429/532 |
| 8,158,254 | B2 | 4/2012 | Wang et al. | |
| 8,216,436 | B2 | 7/2012 | Wang et al. | |
| 8,323,847 | B2* | 12/2012 | Alexandrovichserov | H01M 4/8626 429/483 |
| 9,108,880 | B2* | 8/2015 | Jin | B81C 1/00206 |
| 2008/0143906 | A1* | 6/2008 | Allemand | B82Y 10/00 349/43 |
| 2010/0243295 | A1* | 9/2010 | Allemand | B82Y 10/00 174/250 |
| 2011/0088770 | A1* | 4/2011 | Allemand | B82Y 10/00 136/256 |
| 2011/0162870 | A1* | 7/2011 | Markovich | C23C 18/14 174/126.1 |
| 2012/0172648 | A1 | 7/2012 | Seebauer | |
| 2012/0187375 | A1* | 7/2012 | Guo | H01L 21/845 257/24 |
| 2012/0326125 | A1* | 12/2012 | Guo | H01L 21/845 257/24 |
| 2013/0157447 | A1* | 6/2013 | Street | H01L 21/0245 438/483 |
| 2014/0256534 | A1* | 9/2014 | Gao | B01D 53/944 502/5 |

OTHER PUBLICATIONS

Jiang et al., CuO Nanowires Can Be Synthesized by Heating Copper Substrates in Air. Nano Lett., 2:1333-1338, 2002.
Kaito et al., Electron microscopic studies on structures and reduction process of copper oxide whiskers. J. Cryst. Growth, 74:469-479, 1986.
Koffyberg et al., A photoelectrochemical determination of the position of conduction and valance band edges of p-type CuO. J. Appl. Phys., 53:1173-1177, 1982.
Noh et al., Co nanoparticle hybridization with single-crystalline Bi nanowires. Nanoscale Res. Lett., 6:598, 2011.
Seol et al., Synthesis and Applications of Heteronanostructured ZnO Nanowires Array. World Academy of Science, Engineering & Technology., 79(7):513-515., 2011.
Shi et al., CuO nanowire—Co3O4 nanoparticle heterostructures and their vertically aligned and horizontally suspended architectures. Mater. Res. Soc. Res. Proc., 1256, 1256-N10-03, 2010.
Shi et al., Controlled fabrication of photoactive copper oxide (CuO)—cobalt oxide (Co3O4) nanowire heterostructures for efficient phenol photodegradation, ACS Applied Materials & Interfaces, 4:5590-5607, 2012.
Shi et al., Copper Oxide—Cobalt Oxide Nanoscale Heterostructures for Photocatalysis, NSTI TechConnect World Conference and Expo 2013, Washington, D.C. (May 2013). Poster Presentation. (Abstract retrieved from http://www.techconnectworld.com/World2013/monday.html on Dec. 17, 2014).
Stanton, On the yield and energy distribution of secondary positive ions from metal surfaces. J. Appl. Phys., 31:678-683, 196.
Tak et al., Fabrication of ZnO/CdS core/shell nanowire arrays for efficient solar energy conversion. J Mater. Chem., 19:5945-5951, 2009.
Tan et al., Crystallinity and surface effects on Young's modulus of CuO nanowires. Appl. Phys. Lett., 90:163112, 2007.
Tien et al., One-pot synthesis of a reduced graphene oxide—zinc oxide sphere composite and its use as a visible light photocatalyst. Chem. Engin. J., 229:126-133, 2013.
Toku et al., Helical formation of coated nanowires by viscous flow of core material. Nanosci. Nanotechnol. Lett., 2:197-202, 2010.
Tunc et al., Bandgap determination and charge separation in Ag@TiO2 core shell n anoparticle films. Surf. Interface Anal., 42:835-841, 2010.
Tyczkowski et al., Thin cobalt oxide films for catalysis deposited by plasma-enhanced metal-organic chemical vapor deposition. Thin Solid Film, 515:6590-6595, 2007.
Wang et al., Rutile TiO2 nanowires on anatase TiO2 nanofibers: A branched heterostructured photocatalysts via interface-assisted fabrication approach. Journal of Colloid & Interface Science., 363(1):157-164, 2011.
Yang et al., An Efficient Photocatalyst Structure: TiO2(B) Nanofibers with a Shell of Anatase Nanocrystals. J. Amer. Chem. Soc., 131:17885-17893, 2009.
Zhang et al., In situ tensile testing of individual Co nanowires inside a scanning electron microscope. Nanotechnology, 20:365706, 2009.
Zhang et al., TiO2-assisted photodegradation of dye pollutants II. Adsorption and degradation kinetics of eosin in TiO2 dispersions under visible light irradiation. Appl. Catal. B Enviorn., 15:147-156, 1998.
Zhang et al., Synthesis of TiO2/SiO2 Core/Shell Nanocable Arrays. J. Phys. Chem. B, 108:14866-14869, 2004.
Zhao et al., CuO/ZnO core/shell heterostructure nanowire arrays: synthesis, optical properties, and energy application. Chem. Commun., 46:6768-6770, 2010.
Zhou et al., Epitaxial growth of branched α-Fe2O3/SnO2 nano-heterostructures with improved lithium-ion battery performance. Adv. Funct. Mater., 21:2439-2445, 2011.
Anandan et al., Room temperature growth of CuO nanorod arrays on copper and their application as a cathode in dye-sensitized solar cells. Mater. Chem. Phys., 93:35-40, 2005.
Agarwal et al., Functional materials by electrospinning of polymers. Progress in Polymer Science, 38(6)963-991, 2013.
Asthana et al.,In situ observation of size-scale effects on the mechanical properties of ZnO nanowires. Nanotechnology, 22:265712, 2011.
Bai et al., The design of a hierarchical photocatalyst inspired by natural forest and its usage on hydrogen generation; International Journal of Hydrogen Energy, 37(19), 13998-14008, 2012.
Barrea et al., The potential of supported Cu2O and CuO nanosystems in photocatalytic H2 production. Chem. Sus. Chem., 2:230-233, 2009.
Barreca et al., Composition and microstructure of cobalt oxide thin films obtained from a novel cobalt(II) precursor by chemical vapor deposition. Chem. Mater., 13:588-593, 2001.
Baxter et al., Nanowire-based dye-sensitized solar cells. Appl. Phys. Lett., 86:053114, 2005.
Bierman, et al., Potential applications of hierarchical branching nanowires in solar energy conversion. Energy Environ. Sci., 2:1050-1059, 2009.
Cao, et al., Instability and transport of metal catalyst in the growth of tapered silicon nanowires. Nano Lett, 6:1852-1857, 2006.
Chen et al., Size dependence of Young's modulus in ZnO nanowires. Phys. Rev. Lett., 96:075505, 2006.
Chen, Solid state amorphization in metal/Si system. Mater. Sci. Eng. R, 29:115-152, 2000.
Cheng et al., Cu2O-decorated CdS nanostructures for high efficiency visible light driven hydrogen production. International Journal of Hydrogen Energy., 38(23), 9665-9672, 2013.
Chopra, Multifunctional and multicomponent heterostructured one-dimensional nanostructures: advances in growth, characterisation, and applications. Mater. Technol., 25:212-230, 2010.
Chopra et al., Selective Growth and Kinetic Study of Copper Oxide Nanowires from Patterned Thin Film Multilayer Structures. J. Mater. Res., 2:2691-2699, 2007.
Chou et al., Confocal Raman spectroscopic mapping studies on a single CuO nanowires. Appl. Surf. Sci., 254:7539-7543, 2008.
Chueh et al., RuO2 Nanowires and RuO2/TiO2 Core/Shell Nanowires: From Synthesis to Mechanical, Optical, Electrical, and Photoconductive Properties. Adv. Mater., 19:143-149, 2007.

(56) References Cited

OTHER PUBLICATIONS

Chun et al., Various Synthetic Methods for One-Dimensional Semiconductor Nanowires/Nanorods and Their Applications in Photovoltaic Devices. Eur. J. Inorg. Chem., 27:4251-4263, 2010.
Chung et al., Synthesis of cobalt nanoparticles by DC magnetron sputtering and the effects of electron bombardment. Mater Lett., 58:1437-1440, 2004.
Cornish et al., Hydrogen peroxide enhanced photocatalytic oxidation of microcystin-LR using titanium dioxide. Appl. Catal. A, 25:59-67, 2000.
Feng et al., Sol-Flame Synthesis: A General Strategy to Decorate Nanowires with Metal Oxide/Noble Metal Nanoparticles, Nano Lett., Article ASAP. DOI: 10.1021/nl300060b, 2012.
Fu et al., Fabrication of Heteronanorod Structures by Dynamic Shadowing Growth. IEEE Sens., 8:989-997, 2008.
Gasparotto et al., F-Doped $Co_3O_4$ Photocatalysts for Sustainable $H_2$ Generation from Water/Ethanol. J. Amer. Chem. Soc., 133:19362-19365, 2011.
Gilmer et al., Thin film deposition: fundamentals and modeling. Comput. Mater. Sci., 12:354-380, 1998.
Gouadec et al., Raman Spectroscopy of nanomaterials: How spectra relate to disorder, particle size and mechanical properties. Prog. Cryst. Growth Charact. Mater., 53:1-56, 2007.
Granqvist, Preparation of thin films and nanostructured coatings for clean tech applications: A primer. Sol. Energ. Mat. Sol. C., 99:166-175, 2012.
Gu et al., Synthesis and optical characterization of $Co_3O_4$ nanocrystals. J. Cryst. Growth, 304:369-373, 2007.
Han et al., Synthesis and electronic properties of ZnO/CoZnO core-shell nanowires. Appl. Phys. Lett., 88:133109, 2006.
Hill et al., An Interfacial and Bulk Charge Transport Model for Dye-Sensitized Solar Cells Based on Photoanodes Consisting of Core-Shell Nanowire Arrays. Nano Lett., 133:18663-18672, 2011.
Huang, et al., Large-Area Oblique-Aligned ZnO Nanowires through a Continuously Bent Columnar Buffer: Growth, Microstructure, and Antireflection. Cryst. Growth Des., 10:3297-3301, 2010.
Kamat et al., Meeting the Clean Energy Demand: Nanostructure Architectures for Solar Energy Conversion. J. Phys. Chem. C, 111:2834-2860, 2007.
Kaune et al., In Situ GISAXS Study of Gold Film Growth on Conducting Polymer Films. ACS Appl. Mater. Interfaces, 1:353-360, 2009.
Kemell et al., $Ta_2O_5$ and $TiO_2$ based nanostructures made by atomic layer deposition. Nanotechnology, 21:035301, 2010.
LaForge et al., Glancing angle deposition of crystalline zinc oxide nanorods, Thin Solid Films, 519:3530-3537, 2011.
Li et al., Stability analysis of reactive sputtering process with variable sticking coefficients. Thin Solid Film, 475:102-108, 2002.
Li et al., Vertically aligned and ordered hematite hierarchical columnar arrays for applications in field-emission, superhydrophilicity, and photocatalysis. J. Mater. Chem., 20:2972-2978, 2010.
Long et al., Efficient Photocatalytic Degradation of Phenol over $Co_3O_4$/$BiVO_4$ Composite under Visible Light Irradiation. J. Phys. Chem. B, 110:20211-20216, 2006.
Maeda et al., A copper and chromium based nanoparticulate oxide as a noble-metal-free cocatalyst for photocatalytic water splitting. Chem. Sci., 2:1362-1368, 2011.
Mahadik et al., Photocatalytic oxidation of Rhodamine B with ferric oxide thin films under solar illumination. Materials Research Nulletin., 48(10):4058-4065, 2013.
Mahieu et al., Dependence of the sticking coefficient of sputtered atoms on the target-substrate distance. J. Phys. D: Appl. Phys., 41:152005, 2008.
Mann, Self-assembly and transformation of hybrid nano-objects and nanostructures under equilibrium and non-equilibrium conditions. Nat. Mater., 8:781-792, 2009.
Martin et al., Advances in the growth and characterization of magnetic, ferroelectric, and multiferroic oxide thin films. Mater. Sci. Eng. R., 68:89-133, 2010.
Maruyama et al., Confocal volume in laser Raman microscopy depth profiling. J. Appl. Phys., 110:103107, 2011.
Musin et al., Structural and electronic properties of epitaxial core-shell nanowire heterostructures. Phys. Rev. B, 71:155318, 2005.
Nirmala et al., Photocatalytic activities of electrospun tin oxide doped titanium dioxide nanofibers. Ceramics International., 38(6):4533-4540, 2012.
Pan et al., Photocatalytic reduction of carbon dioxide on NiO/$InTaO_4$ under visible light irradiation. Catal. Comm., 8:1546-1549, 2007.
Petrov et al., Microstructural evolution during film growth. J. Vac. Sci. Technol. A, 21:S117-S128, 2005.
Ribbens et al., Systematic evaluation of thermal and mechanical stability of different commercial and synthetic photocatalysts in relation to their photocatalytic activity, Micropor. Mesopor Mat., 156:62-72, 2012.
Shahid et al., Facile synthesis of core-shell $SnO_2$/$V_2O_5$ nanowires and their efficient photocatalytic property. Mater. Chem. Phys., 124:619-622, 2010.
Shen et al., Tuning the Shape and Strain in Micro/Nanowires by a Sideways Physical Deposition Process. J. Phys. Chem. C, 114:21277-21280, 2010.
Shi et al., Surfactant-free synthesis of novel copper oxide (CuO) nanowire-cobalt oxide ($Co_3O_4$) nanoparticle heterostructures and their morphological control. J. Nanopart Res., 13:851-868, 2011.

\* cited by examiner

OXIDE-BASED NANOSTRUCTURES AND METHODS FOR THEIR FABRICATION AND USE

CROSS REFERENCE TO RELATED APPLICATIONS

This application claims benefit of U.S. Provisional Application No. 61/878,366, filed Sep. 16, 2013, which is hereby incorporated by reference in its entirety.

STATEMENT OF GOVERNMENT SUPPORT

This invention was made with government support under Grant No. 0925445 awarded by the National Science Foundation. The government has certain rights in this invention

BACKGROUND

Bottom-up and/or top-down growth methods that allow easy manipulation of chemical composition and morphology of heterostructured 1-D nanostructures, such as core/shell nanowires, are a fabrication challenge (Mann, S. *Nat. Mater.* 2009, 8, 781-792; Kamat, P. V. *J. Phys. Chem. C* 2007, 111, 2834-2860; Fu, J. X.; He, Y. P.; Zhao, Y. P. *IEEE Sens. J.* 2008, 8, 989-997; Bierman, M. J.; Jin, S. *Energy Environ. Sci.* 2009, 2, 1050-1059; Eymery, G.; Biasiol, J.; Kapon, E.; Ogino, T. C. R. *Physique,* 2005, 6, 105-116). The interfaces in such heterostructured and semiconducting nanowires (e.g., oxides, nitrides, and phosphides) facilitate rapid charge transport and exhibit unique electronic and photonic properties (Grimes, C. A.; Varghese, O. K.; Ranjan, S. K. *Light, water, and hydrogen: The solar generation of hydrogen by water photoelectrolysis*; Springer: New York, 2008; Baxter, J. B.; Aydil, E. S. *Appl. Phys. Lett.* 2005, 86, 053114; Zhou, W.; Cheng, C.; Liu, J.; Tay, Y. Y.; Jiang, J.; Jia, X.; Zhang, J.; Gong, H.; Hng, H. H.; Fan H. J. *Adv. Funct. Mater.* 2011, 21, 2439-2445; Hill, J. J.; Banks, N.; Haller, K.; Orazem, M. E.; Ziegler, K. J. *Nano Lett.* 2011, 133, 18663-18672; Musin, R. N.; Wang, X. Q. *Phys. Rev. B* 2005, 71, 155318). For example, core/shell nanowire heterostructures can allow for multi-level light-matter interaction with charge transport directed across the thin shell (radially) and rapid charge conduction through the core (longitudinally) (Kamat, P. V. *J. Phys. Chem. C* 2007, 111, 2834-2860; Bierman, M. J.; Jin, S. *Energy Environ. Sci.* 2009, 2, 1050-1059; Yang, D.; Liu, H.; Zheng, Z.; Yuan, Y.; Zhao, J. C.; Waclawik, E. R.; Ke, X.; Zhu, H. *J. Amer. Chem. Soc.* 2009, 131, 17885-17893). Such interaction is not possible with single-component nanowires and makes nanowire heterostructures extremely attractive for water splitting, $CO_2$ photocatalytic reduction (Pan, P, W.; Chen, Y. W. *Catal. Comm.* 2007, 8, 1546-1549), and solar energy harvesting (Bierman, M. J.; Jin, S. *Energy Environ. Sci.* 2009, 2, 1050-1059; Hill, J. J.; Banks, N.; Haller, K.; Orazem, M. E.; Ziegler, K. J. *Nano Lett.* 2011, 133, 18663-18672; Barreca, D.; Fornasiero, P.; Gasparotto, A.; Gombac, V.; Maccato, C.; Montini, T.; Tondello, E. *Chem. Sus. Chem.* 2009, 2, 230-233).

Nanowire heterostructures composed of oxides are of interest for a wide array of applications and can be synthesized using various methods including solution synthesis, gas phase growth (physical vapor deposition (PVD) and chemical vapor deposition (CVD)), air oxidation, and flame synthesis (Kemell, M.; Harkonen, E.; Pore, V.; Ritala, M.; Leskela, M. *Nanotechnology* 2010, 21, 035301; Zhang, H.; Luo, X.; Xu, J.; Xiang, B.; Yu, D. *J. Phys. Chem. B* 2004, 108, 14866-14869; Chopra, N. *Mater. Technol.* 2010, 25, 212-230; Shahida, M.; Shakira, I.; Yang, S. J.; Kang, D. J. *Mater. Chem. Phys.* 2010, 124, 619-622; Chueh, Y. L.; Hsieh, C. H.; Chang, M. T.; Chou, L. J.; Lao, C. S.; Song, J. H.; Gan, J. Y.; Wang, Z. L. *Adv. Mater.* 2007, 19, 143-149; Feng, Y.; Cho, I. S.; Rao, P. M.; Cai, L.; Zheng, X. *Nano Lett.* 2012, Article ASAP. DOI: 10.1021/n1300060b; Chun, J.; Lee, J. *Eur. J. Inorg. Chem.* 2010, 27, 4251-4263). Typically, a core nanowire is coated with a layer of second component with specific thickness and composition (Kemell, M.; Harkonen, E.; Pore, V.; Ritala, M.; Leskela, M. *Nanotechnology* 2010, 21, 035301; Zhang, H.; Luo, X.; Xu, J.; Xiang, B.; Yu, D. *J. Phys. Chem. B* 2004, 108, 14866-14869; Shahida, M.; Shakira, I.; Yang, S. J.; Kang, D. J. *Mater. Chem. Phys.* 2010, 124, 619-622; Tak, Y.; Hong, S. J.; Lee, J. S.; Yong, K. *J. J Mater. Chem.* 2009, 19, 5945-5951). The solution routes have their advantages; they are simple, cheap, and scalable (Tak, Y.; Hong, S. J.; Lee, J. S.; Yong, K. *J. J Mater. Chem.* 2009, 19, 5945-5951; Shi, W.; Chopra, N. *J. Nanopart Res.* 2011, 13, 851-868). Dispersion of metal salts onto nanowire and subsequent thermal decomposition has shown potential to result in nanowire heterostructures organized in vertical arrays or horizontally-suspended architectures (Shi, W.; Chopra, N. *J. Nanopart Res.* 2011, 13, 851-868; Zhao, X.; Wang, P.; Li, B. *Chem. Commun.* 2010, 46, 6768-6770). Flame synthesis is a scalable approach for fabricating oxide nanowire heterostructures but the challenge is to control the growth of uniform and thin oxide shells around core nanowires (Feng, Y.; Cho, I. S.; Rao, P. M.; Cai, L.; Zheng, X. *Nano Lett.* 2012, Article ASAP. DOI: 10.1021/n1300060b). Gas phase techniques are well suited but necessitate understanding materials-specific thermodynamics and processes to avoid formation of continuous films on the surfaces (Wolf, S.; Tauber, R. N. *Silicon Processing for the VLSI Era*. Lattice Press: Sunset Beach, 1999). Although atomic level control of stoichiometric ratio and perfect site-selective deposition can be obtained for nanowire heterostructures using CVD and pulsed laser deposition (PLD) (Li, L.; Koshizaki, N. *J. Mater. Chem.* 2010, 20, 2972-2978; Han, S.; Zhang, D.; Zhou, C. *Appl. Phys. Lett.* 2006, 88, 133109), high cost and low through-put remains a problem. As compared to the abovementioned methods, sputter deposition is a conventional, scalable, and cost-effective technique for assembling oxide nanostructures (e.g., nanowires) on the substrate, without patterning or using templates (LaForge, J. M.; Taschuk, M. T.; Brett, M. J. *Thin Solid Films* 2011, 519, 3530-3537; Huang, J. H.; Chen, C. Y.; Lai, Y. F.; Shih, Y. I.; Lin, Y. C.; He, J. H.; Liu, C. P. *Cryst. Growth Des.* 2010, 10, 3297-3301). This approach also holds significant promise for developing complex nanowire heterostructures (Noh, J. S.; Lee, M. K.; Ham, J.; Lee, W. *Nanoscale Res. Lett.* 2011, 6, 598).

Among various oxides, CuO and $Co_3O_4$ photocatalysts are of particular interest (Barreca, D.; Fornasiero, P.; Gasparotto, A.; Gombac, V.; Maccato, C.; Montini, T.; Tondello, E. *Chem. Sus. Chem.* 2009, 2, 230-233; Shi, W.; Chopra, N. *J. Nanopart Res.* 2011, 13, 851-868; Zhao, X.; Wang, P.; Li, B. *Chem. Commun.* 2010, 46, 6768-6770; Shi, W.; Chopra, N. *Mater. Res. Soc. Res. Proc.* 2010, 1256, 1256-N10-03; Gasparotto, A.; Barreca, D.; Bekermann, D.; Devi, A.; Fischer, R. A.; Fornasiero, P.; Gombac, V.; Lebedev, O. L.; Maccato, C.; Montini, T.; Tendeloo, G. V.; Tondello, E. *J. Amer. Chem. Soc.* 2011, 133, 19362-19365). These oxides are stable and can result in narrow to wide band gap energies depending on their dimensions/morphologies (Grimes, C. A.; Varghese, O. K.; Ranjan, S. K. *Light, water, and hydrogen: The solar generation of hydrogen by water photoelectrolysis.*; Springer: New York, 2008; Barreca, D.; Fornasiero, P.; Gasparotto, A.; Gombac, V.; Maccato, C.; Montini, T.; Tondello, E. *Chem. Sus. Chem.* 2009, 2, 230-233). Such oxide-based photocatalysts are also considered as potential replacements for precious metals (Maeda, K.; Ohno, T.; Domen, K. *Chem. Sci.* 2011, 2, 1362-1368). In addition, semiconducting CuO nanowires can be grown in a simple and environment-friendly method (Jiang, X.; Herricks, T.; Xia, Y. *Nano Lett.* 2002, 2, 1333-1338). They can survive multiple processing steps and have the ability to combine with other material systems. All these characteristics make them interesting base materials for nanowire heterostructures (Feng, Y.; Cho, I. S.; Rao, P. M.; Cai, L.; Zheng, X. *Nano Lett.* 2012, Article ASAP. DOI: 10.1021/nl300060b; Jiang, X.; Herricks, T.; Xia, Y. *Nano Lett.* 2002, 2, 1333-1338; Kaito, C.; Nakata, Y.; Saito, Y.; Naiki, T.; Fujita, K. *J. Cryst. Growth* 1986, 74, 469-479).

It was reported that CuO nanowires-$Co_3O_4$ nanoparticles heterostructures have unique photoactivity under low power (8 W) illumination lamp with organic dye degradation efficiencies as high as 17% compared to pristine CuO nanowires (Shi, W.; Chopra, N. *J. Nanopart Res.* 2011, 13, 851-868). The synthesis approach for these heterostructures involved wet-chemical coating of CuO nanowires with cobalt salt and thermal decomposition of the latter to obtain $Co_3O_4$ nanoparticles (Shi, W.; Chopra, N. *J. Nanopart Res.* 2011, 13, 851-868). However, this approach limited the growth of $Co_3O_4$ in the form of well-dispersed nanoparticles or islands on the CuO nanowire surface. Furthermore, such a processing method does not necessarily allow for manipulation of Cu and Co content in the heterostructures. What are needed are different processing methods that provide tenability of heterostructure morphology and composition. The methods and compositions disclosed herein address these and other needs.

SUMMARY

In accordance with the purposes of the disclosed materials, compounds, compositions, articles, devices, and methods, as embodied and broadly described herein, the disclosed subject matter, in one aspect, relates to compositions and methods for preparing and using the disclosed compositions. In more specific aspects, a method of forming metal oxide-metal oxide nanowires is disclosed. In particular, copper oxide-cobalt oxide nanowires are also disclosed. Methods of making and using these materials are also disclosed.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DESCRIPTION OF FIGURES

FIG. 16(c, d) are TEM images of sample #12B (5 min sputtering, 5 hrs annealing). FIG. 16(e, f) are TEM images of sample #13B (5 min sputtering, 7.5 hrs annealing). All sample fabrication details are given in Table 1.

FIG. 17(e, f) are FFT images corresponding to (c) and (d), respectively. FIG. 17(g) is a Carine Crystallography™ generated image showing lattice relationship between CuO nanowire and $Co_3O_4$ shell. The choice of short annealing duration ensured that interfaces are clearly visible. All sample fabrication details are given in Table 1.

FIG. 18(f) is an electron diffraction of $Co_3O_4$ nanotubes after selective etching of CuO nanowire cores, and FIG. 18(g) is a HAADF-STEM image of $Co_3O_4$ nanotubes and corresponding FIG. 18(h) is an EDS line profile. The line in FIG. 18(g) indicates the line profile scan path and the rectangular box indicates the drift correction. $Co_3O_4$ nanotubes were fabricated by selectively etching CuO nanowires from sample #3B (Table 1).

FIG. 21(a) is the absorbance vs. wavelength spectra for CuO nanowires and $CuO$—$Co_3O_4$ nanowire heterostructures.

FIG. 24(a) shows first order kinetics (linear fitting) of photodegradation behavior for various photocatalysts and rate constants (b). This data is obtained from FIG. 22(b) and the photodegradation reaction was performed under visible illumination with $H_2O_2$.

DETAILED DESCRIPTION

Figure 1:
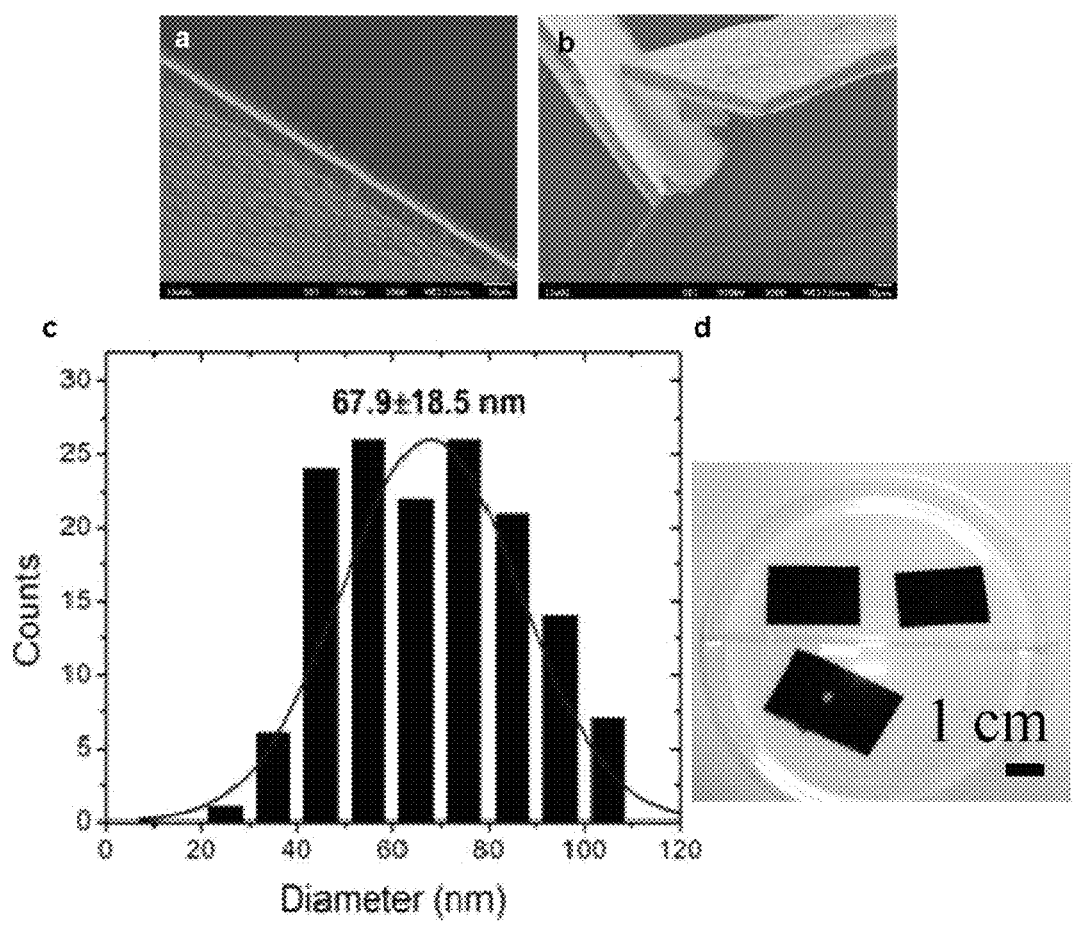
FIG. 1(a) is a SEM image of vertically-aligned CuO nanowires on a large-area copper substrate and FIG. 1(b) a SEM image of the vertically-aligned CuO—Co nanowire heterostructure. The Co was sputtered on vertically-aligned CuO nanowires for 30 min at 100 watts under 3 mTorr deposition pressure.
FIG. 1(c) is a histogram showing diameter distribution and average diameter for the as-produced CuO nanowires.
FIG. 1(d) is a digital image of the sample showing CuO—Co nanowire heterostructure on a copper substrate.

The materials, compounds, compositions, articles, devices, and methods described herein may be understood more readily by reference to the following detailed description of specific aspects of the disclosed subject matter, figures and the Examples included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Reference will now be made in detail to specific aspects of the disclosed materials, compounds, compositions, articles, and methods, examples of which are illustrated in the accompanying Examples and Figures.

Methods of Synthesis

Disclosed is a dry processing method that allows tunability of heterostructure morphology and composition. Correlation of the latter aspects with photocatalytic activity allows systematic exploitation of quantum confinement and surface effects in these heterostructured nanowires. Specifically, the morphological and structural evolution of metal oxide-metal oxide nanowire heterostructures in a surfactant-free and dry processing approach that combines line-of-sight sputter deposition method with thermal annealing process is disclosed. Controlled structure, morphology, and interfaces in $CuO—Co_3O_4$ nanowire heterostructures can lead to precise tuning of their band gap energies and photocatalytic ability. This disclosure emphasizes the growth mechanisms, morphological evolution, structural integrity, and nanomechanical aspects of nanowire heterostructures. In addition, the photocatalytic behavior of fabricated $CuO—Co_3O_4$ nanowire heterostructures is studied for phenol photodegradation in UV and visible light illumination with or without sacrificial agent ($H_2O_2$).

Disclosed herein are methods of forming metal oxide-metal oxide heterostructure nanowires. The method comprises the steps of heating a metal film to form metal oxide nanowires, depositing a second metal on the metal oxide nanowires, and thermally annealing the coated nanowires to form metal oxide-metal oxide nanowires. Also disclosed herein are methods of forming copper oxide-cobalt oxide nanowires.

The Metal Oxide Nanowires

The metal oxide nanowires can be synthesized through heating a metal film. The metal film can be heated at a temperature of 100-600° C., for example at least 100° C., 120° C., 150° C., 170° C., 200° C., 220° C., 250° C., 270° C., 300° C., 320° C., 350° C., 370° C., 400° C., 420° C., 450° C., 470° C., 500° C., 520° C., 550° C., 570° C., or 600° C., where any of the stated values can form an upper or lower endpoint of a range. The metal film can be heated for from 1 to 24 hours, for example at least 1 hour, 2 hours, 3 hours, 4 hours, 5 hours, 6 hours, 7 hours, 8 hours, 9 hours, 10 hours, 12 hours, 14 hours, 16 hours, 18 hours, 20 hours, 22 hours, or 24 hours, where any of the stated values can form an upper or lower endpoint of a range.

In some examples, the metal film is a transition metal. Examples of suitable transition metals are copper, iron, nickel, ruthenium, titanium, vanadium, manganese, cobalt, zinc, zirconium, rhodium or combinations thereof. In some examples, the metal film is copper.

Coating the Metal Oxide Nanowires

The metal oxide nanowires can be coated with a second metal. In some examples, the second metal is deposited using physical vapor deposition. Physical vapor deposition is a variety of vacuum deposition methods used to deposit thin films by the condensation of a vaporized form of the desired film material onto various work piece surfaces. The coating method involved purely physical processes such as high-temperature vacuum evaporation with subsequent condensation, or plasma sputter bombardment rather than involving chemical reaction at the surface to be coated as in chemical vapor deposition.

Variants of physical vapor deposition, include cathodic arc deposition, electron beam physical vapor deposition, evaporative deposition, pulsed laser deposition and sputter deposition. In some examples, sputter deposition is used as the deposition method for the second metal. Sputter deposition is a physical vapor deposition method of deposition thin films by sputtering. This involved ejecting material from a target that is a source onto a substrate. An important advantage of sputter deposition is that even materials with very high melting points are easily sputtered while evaporation of these materials in a resistance evaporator is problematic. Sputter deposited films have composition close to that of the source material. Sputtered films typically have a better adhesion on the substrate than evaporated films. A target contains a large amount of material and is maintenance free making the technique suited for ultrahigh vacuum applications. Sputtering sources contain no hot parts (to avoid heating they are usually water cooled) and are compatible with reactive gases such as oxygen. Sputtering can be performed top-down while evaporation must be performed bottom-up.

In some examples, the second metal is deposited for from 1 to 50 minutes, for example at least 1 minute, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, 35 minutes, 40 minutes, 45 minutes or 50 minutes, where any of the stated values can form an upper or lower endpoint of a range.

In some examples, the second metal comprises a transition metal. Examples of suitable transition metals are copper, iron, nickel, ruthenium, titanium, vanadium, manganese, cobalt, zinc, zirconium, rhodium or combinations thereof. In some examples, the second metal is cobalt.

Annealing the Metal Coated Metal Oxide Nanowires

After coating the metal oxide nanowires with the second metal, the structures can be annealed to form the metal oxide-metal oxide heterostructure nanowires. In some examples, the annealing temperature is from 100 to 1000° C., for example at least 100° C., 150° C., 200° C., 250° C., 300° C., 350° C., 400° C., 450° C., 500° C., 550° C., 600° C., 650° C., 700° C., 750° C., 800° C., 850° C., 900° C., 950° C. or 1000° C., where any of the stated values can form an upper or lower endpoint of a range. In some examples, the sample is annealed for from 1 minute to 24 hours, for example at least 1 minute, 5 minutes, 10 minutes, 20 minutes, 30 minutes, 1 hour, 2 hours, 3 hours, 4 hours, 5 hours, 7.5 hours, 10 hours, 15 hours, 20 hours or 24 hours, where any of the stated values can form an upper or lower endpoint of a range.

The resulting metal oxide-metal oxide heterostructure nanowires can have diameters of from 20 to 200 nm, for example at least 20 nm, 30 nm, 40 nm, 50 nm, 60 nm, 70 nm, 80 nm, 90 nm, 100 nm, 125 nm, 150 nm, 175 nm or 200 nm, where any of the stated values can form an upper or lower endpoint of a range.

Methods of Use

The disclosed methods of making the metal oxide-metal oxide nanowires are flexible in the types of metal oxides used, the ratio of the different metal oxides, diameter of the overall structures and other features. This allows for the fabrication of structures that may be tuned for a variety of applications.

In some examples, the materials disclosed herein are used as a photocatalyst. A photocatalyst is a light-absorbing substance which, when added to a reaction, facilitates the reaction, while remaining substantially unchanged at the end of the reaction. Herein, the structure can be tuned to have a specific band gap energy for the desired application. A band gap, also called an energy gap or bandgap, is an energy range in a solid where no energy states can exist. In graphs of the electronic band structure of solids, the band gap generally refers to the energy difference between the top of the valence band and the bottom of the conduction band. This is equivalent to the energy required to free an outer shell electron from its orbit around the nucleus to become a mobile charge carrier, able to move freely within the solid material, so the band gap is a major factor determining the electrical conductivity of a solid. Substances with large band gaps are generally insulators, those with smaller band gaps are semiconductors, while conductors either have very small band gaps or none, because the valence and conduction bands overlap. It is possible to change the band gap energy by altering the composition of the material(s), i.e. doping. Herein, the band gap energy of the final structure can be tuned by varying the identities of the metal oxides, the proportions of the oxides and various other parameters.

In some examples, the materials disclosed herein are used as photocatalysts for organic decontamination and/or environmental remediation. In some examples, the materials disclosed herein are used for solar energy conversion. In some examples, the materials disclosed herein are used for photodegradation of PCBs. In some examples, the materials disclosed herein are used for carcinogens. In some examples, the materials disclosed herein are used as nanocatalysts. In some examples, the materials disclosed herein are used in automotive, construction, consumer product, energy, environmental and/or medical applications. In some examples, the materials disclosed herein are used for water splitting. In some examples, the materials disclosed herein are used for hydrogen generation. In some examples, the materials disclosed herein are used as a solar fuel catalyst. In some examples, the materials disclosed herein are used for phenol degradation.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Methods:

Materials, Methods, and Characterization

Copper foil (0.254 mm thick, 99.9%), hydrogen peroxide (35%), and phenol (99+%) were purchased from Alfa Aesar (Ward Hill, Mass.). Nitric Acid ($HNO_3$, 69.5%) and hydrochloric acid (HCl, 37%) were purchased from Fisher Scientific (Pittsburgh, Pa.). Deionized (DI, 18.1 MΩ cm) water was obtained using a Barnstead International DI water system (E-pure D4641). Quartz cuvette for photodegradation and UV experiments was purchased from Ocean Optics (Dunedin, Fla.). UV and visible light lamps were obtained from Fisher Scientific (Pittsburgh, Pa.). Box furnace used for annealing process was purchased from MTI Inc. (Redmond, Calif.). Microscopic characterization and Energy-dispersive X-ray spectroscopy (EDS) were performed using Field Emission Scanning Electron Microscope (FE-SEM, JEOL-7000, equipped with Oxford EDX detector) and Transmission Electron Microscope (TEM, Tecnai FEI-20). X-ray diffraction (XRD) patterns were collected with a Philips diffractometer (XRG 3100, Cu Kα radiation, 35 mA and 40 kV). In order to eliminate copper substrate, all films were scratched and grounded into powder before loading into diffractometer. The Raman spectra and depth profiling were recorded using Senterra micro-Raman spectrometer (Bruker Optics, Woodlands, Tex.) equipped with a 785 nm laser and a motorized stage with 0.1 μm positioning accuracy in z-direction. Laser power of 10 mW was utilized to minimize the thermal effect of laser. UV-vis-NIR spectroscopy was performed using Ocean Optics USB 4000 spectrometer (Dunedin, Fla.) with a reflection/backscattering probe. The reference spectrum was collected using Polytetrafluoroethylene (PTFE) as a reflective standard. Sputter deposition was performed using AJA International (North Situate, Mass.) Orion 3 sputtering system and the high purity Co target (99.99%, 3 mm thickness, 2" diameter) was bought from the same.

Synthesis of CuO—Co Nanowire Heterostructures, CuO—$Co_3O_4$ Nanowire Heterostructures, and $Co_3O_4$ Nanotubes A copper foil (99.9%, 0.254 mm thick, 2×2 $cm^2$) was immersed into diluted $HNO_3$ solution (1:2 v/v $HNO_3$:$H_2O$) for 15 sec to remove native oxide layer. The cleaned copper foil was washed with copious amounts of deionized (DI) water and dried. Subsequently, the substrate was placed in a ceramic crucible and heated at 410° C. in a box furnace in air. After 6 hrs, the furnace was cooled down naturally and a black film of vertically-aligned CuO nanowires was formed on the copper foil (Shi, W.; Chopra, N. *Mater. Res. Soc. Res. Proc.* 2010, 1256, 1256-N10-03; Jiang, X.; Herricks, T.; Xia, Y. *Nano Lett.* 2002, 2, 1333-1338). These nanowires were further sputtered with Co films using high purity Co target to result in standing CuO—Co nanowire heterostructures. The sputtering target-to-sample distance was kept constant at ~10 cm. The base pressure of chamber was lower than $2\times10^{-7}$ Torr and deposition pressure was maintained at 3 mTorr with 25.1 sccm Ar flow. Before opening the target shutter and actual deposition on the substrate, the target was pre-sputtered for at least 2 min to eliminate native oxide layers. In regard to manipulating the morphology of the coated Co on CuO nanowires, effect of sputtering time was studied (1 min to 50 min) After sputtering, the chamber was vented with dry $N_2$ flow (~5 psi). A control sample was prepared by sputter deposition of Co film on the cleaned $Si/SiO_2$ wafer and this aided in estimating Co film thickness and sputter deposition rate/flux for calibration purposes. Film thickness of this control sample was measured by a profilometer (Veeco, Plainview, N.Y.). The standing CuO—Co nanowire heterostructures were formed as a film (black film) on the base copper substrate and were gently peeled off from the latter. This black film was loaded into a ceramic boat and air-annealed at 520° C. for different durations to study the formation of standing CuO—$Co_3O_4$ nanowire heterostructures. A detailed parametric study was conducted as listed in Table 1 to understand the role of sputtered Co morphology and thickness in the morphological evolution of $Co_3O_4$ on CuO nanowires as a function of Co sputtering time and annealing duration. As a next step sample #3B (Table 1) was utilized to fabricate $Co_3O_4$ nanotubes. Diluted HCl (2:5 v/v 35% HCl: $H_2O$) was used to selectively remove CuO nanowires from the core. Approximately, 1 mL diluted acid solution was dropped into a cleaned watch glass containing CuO—$Co_3O_4$ nanowire heterostructures. The etching process was allowed for 2 min. After this duration, the remaining $Co_3O_4$ nanotubes were collected and rigorously washed with DI water several times using a centrifuge (6000 rpm) for 1 min. The washing process was continued till the pH of the solution was neutral.

TABLE 1

Experimental conditions for sputter deposition of Co on CuO nanowires and their subsequent air annealing to result in CuO—$Co_3O_4$ nanowire heterostructures.

| Deposition conditions for the formation CuO—Co nanowire heterostructures | | | Air annealing conditions for the formation CuO—$Co_3O_4$ nanowire heterostructures | |
|---|---|---|---|---|
| Sample number | Sputtering time (min) | Sputtering power (watts) | Sample number | Annealing time |
| 1A | 1 | 100 | 1B | 10 h |
| 2A | 5 | 100 | 2B | 10 h |
| 3A | 10 | 100 | 3B | 10 h |
| 4A | 20 | 100 | 4B | 10 h |
| 5A | 30 | 100 | 5B | 10 h |
| 6A | 50 | 100 | 6B | 10 h |
| 7A | 5 | 100 | 7B | 5 min |
| 8A | 5 | 100 | 8B | 10 min |
| 9A | 5 | 100 | 9B | 20 min |
| 10A | 5 | 100 | 10B | 60 min |
| 11A | 5 | 100 | 11B | 2.5 h |
| 12A | 5 | 100 | 12B | 5 h |
| 13A | 5 | 100 | 13B | 7.5 h |
| 2A | 5 | 100 | 2B | 10 h |

Series A represents samples before air annealing and series B corresponds to samples after air annealing.
Annealing time indicates the duration for which CuO—Co nanowire heterostructures were annealed in air,
sample #2 is the baseline fabrication conditions, and the chamber pressure during sputter deposition was kept constant at 3 mTorr.
Shaded regions indicate the variable parameter for the specific conditions. For example, for samples #1A-6A, only sputtering time was varied while all other sputtering conditions (power, pressure, and sample to target distance) were kept fixed.

Phenol Photodegradation Study Using CuO—$Co_3O_4$ Nanowire Heterostructures

In order to test the photocatalytic abilities of the CuO—$Co_3O_4$ nanowire heterostructures, phenol photodegradation experiments were conducted and various parameters were studied. These include illumination wavelength (UV and visible), presence and absence of sacrificial agent ($H_2O_2$), and morphology of $Co_3O_4$ coating on CuO nanowires (Sample #1B-6B, Table 1). The degradation experiments were performed inside a quartz cuvette (1 cm×1 cm×4 cm) and for all the experiments the ratio of photocatalyst amount to phenol volume is kept constant at ~1 g/L. Approximately, 3 mg photocatalyst (as-produced CuO nanowires, $Co_3O_4$ nanotubes, or CuO—$Co_3O_4$ nanowire heterostructures) was dispersed and briefly sonicated (1 min) in 3 mL of phenol (0.2 mM). This was followed by addition of ~12 µL $H_2O_2$ (37%). An illumination lamp (UV source: centered at 254 nm, 8 W) was placed above the cuvette and the solution was gently stirred. UV-vis spectroscopy was utilized to measure the concentration of phenol and the spectrum was collected every 2 minutes. Photodegradation efficiency (η) was calculated using the following equation:

$$\eta = [1 - C_t/C_o] \times 100$$

Where $C_0$ is the initial phenol concentration and $C_t$ is the concentration of phenol at time t=t. Similar photocatalytic degradation experiments were conducted for white light illumination (centered at 580 nm, 8 W), with and without sacrificial agent ($H_2O_2$), where the catalyst/phenol solution ratio (1 g/L) was kept constant. For visible light illumination experiments, the photodegradation with $H_2O_2$ was carried out in the phenol concentration of ~0.2 mM. In case of photodegradation without $H_2O_2$, the phenol concentration was ~0.1 mM. The sampled solution for visible light experiments was analyzed every 30 or 60 minutes using UV-vis spectroscopy. The kinetics of phenol photodegradation was also studied.

Absorbance and Band Gap Energy Measurements

The reflectance spectra for the samples (as-produced CuO nanowires, $Co_3O_4$ nanotubes, and CuO—$Co_3O_4$ nanowire heterostructures) used for photodegradation studies were obtained using reflectance mode UV-vis spectroscopy. Band gap energies were derived using Kubelka-Munk (α) function as follows (Tune, I.; Bruns, M.; Liemann, H. G.; Grunze, M.; Koelsch, P. *Surf Interface Anal.* 2010, 42, 835-841):

$$\alpha = (1-R)^2/2R = K/S,$$

where R is the measured reflectance of sample (ratio between $R_{sample}$ and $R_{standard}$), K is the absorption coefficient, and S is the scattering coefficient. Assuming indirect band gap transition, $(\alpha h\nu)^{1/2}$ vs. hv was plotted, where h is the Planck's constant and v is the frequency ($s^{-1}$). The intercept of the linear part of the plot on the x axis (or hv axis) indicates the band gap energy (eV).

Results and Discussion:

Fabrication of CuO—Co Nanowire Heterostructures and their Growth Mechanism and Nanomechanics High aspect ratio and vertically-aligned CuO nanowires (FIG. 1a,c) were grown by heating copper substrate in air with the growth governed by vapor-solid (VS) growth mechanism (Jiang, X.; Herricks, T.; Xia, Y. *Nano Lett.* 2002, 2, 1333-1338; Chopra, N.; Hu, B.; Hinds, B. J. *J. Mater. Res.* 2007, 22, 2691-2699). The diameter, length, spatial density, and inter-nanowire spacing for the as-prepared CuO nanowires were ~67.9±18.6 nm, ~5 µm, ~9.4×10$^8$ per cm$^2$, and ~267 nm, respectively. Subsequently, CuO nanowires were sputter coated with Co (FIG. 1b,d). In order to vary the thickness (or Co content), morphology, and crystallinity of the Co coating, the process of Co sputter deposition was studied as a function of deposition duration (Table 1, A-series samples) (Noh, J. S.; Lee, M. K.; Ham, J.; Lee, W.

Figure 3:
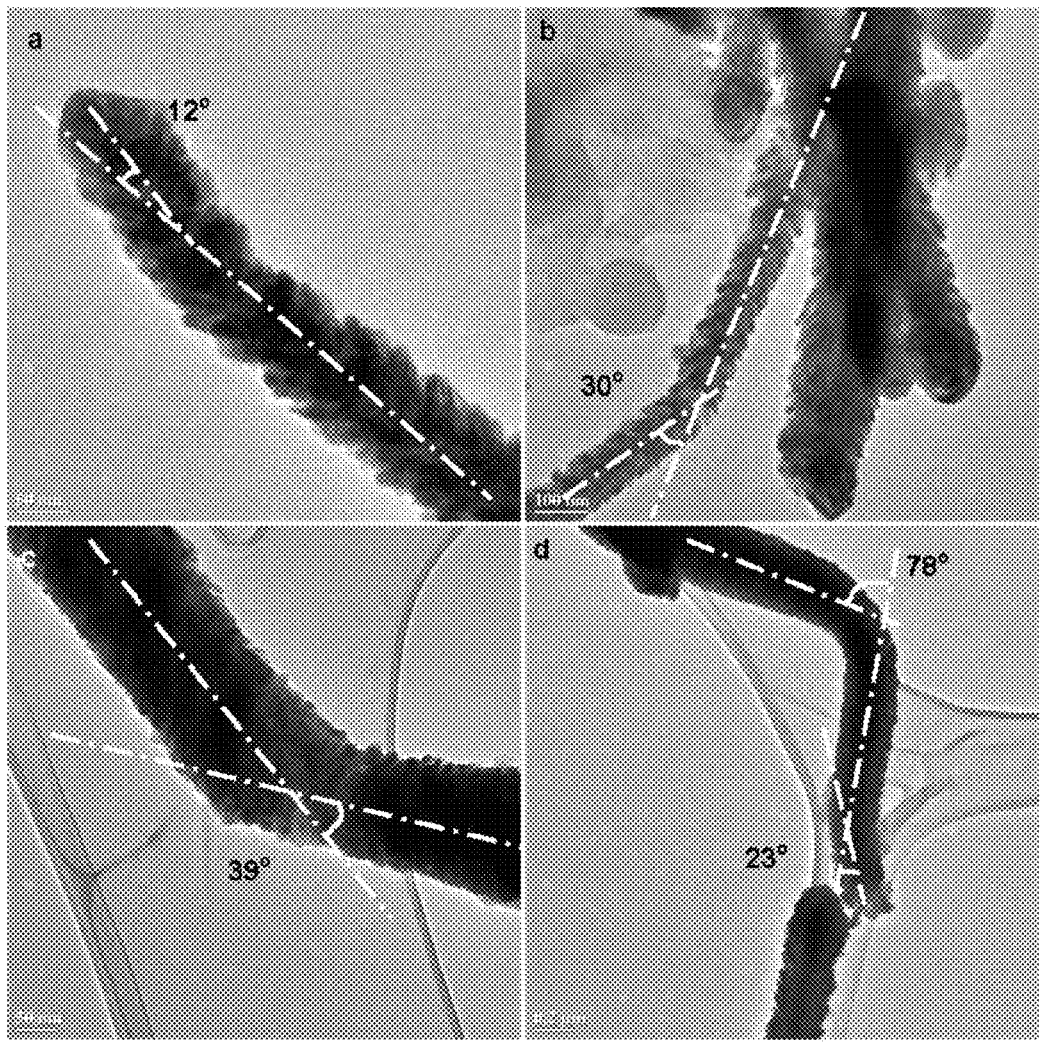
FIG. 3 contains TEM images showing bending of CuO—Co nanowire heterostructures for (a, b) 20 min sputtering duration (Sample #4A, Table 1) and (c, d) 50 min sputtering duration (Sample #6A, Table 1).
Figure 4:
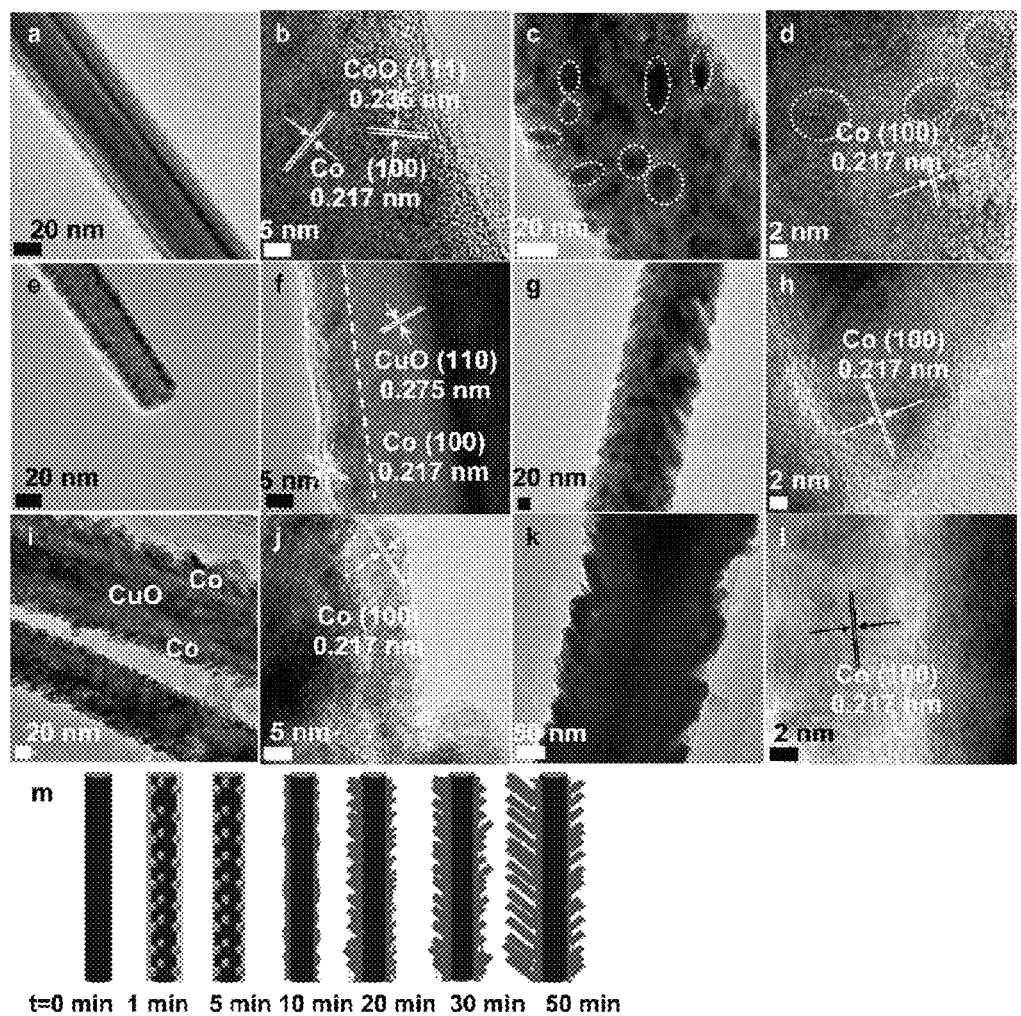
FIG. 4 contains TEM images of CuO—Co nanowire heterostructures after sputter deposition of Co for (a, b) 1 min, (c, d) 5 min, (e, f) 10 min, (g, h) 20 min, (i, j) 30 min, (k, l) 50 min, and (m) schematic showing the morphological evolution of Co coating on CuO nanowires. The dotted circles indicate the presence of Co nanoparticles embedded within Co thin film. The dotted line in (f) shows the interface between Co and CuO.
Figure 5:
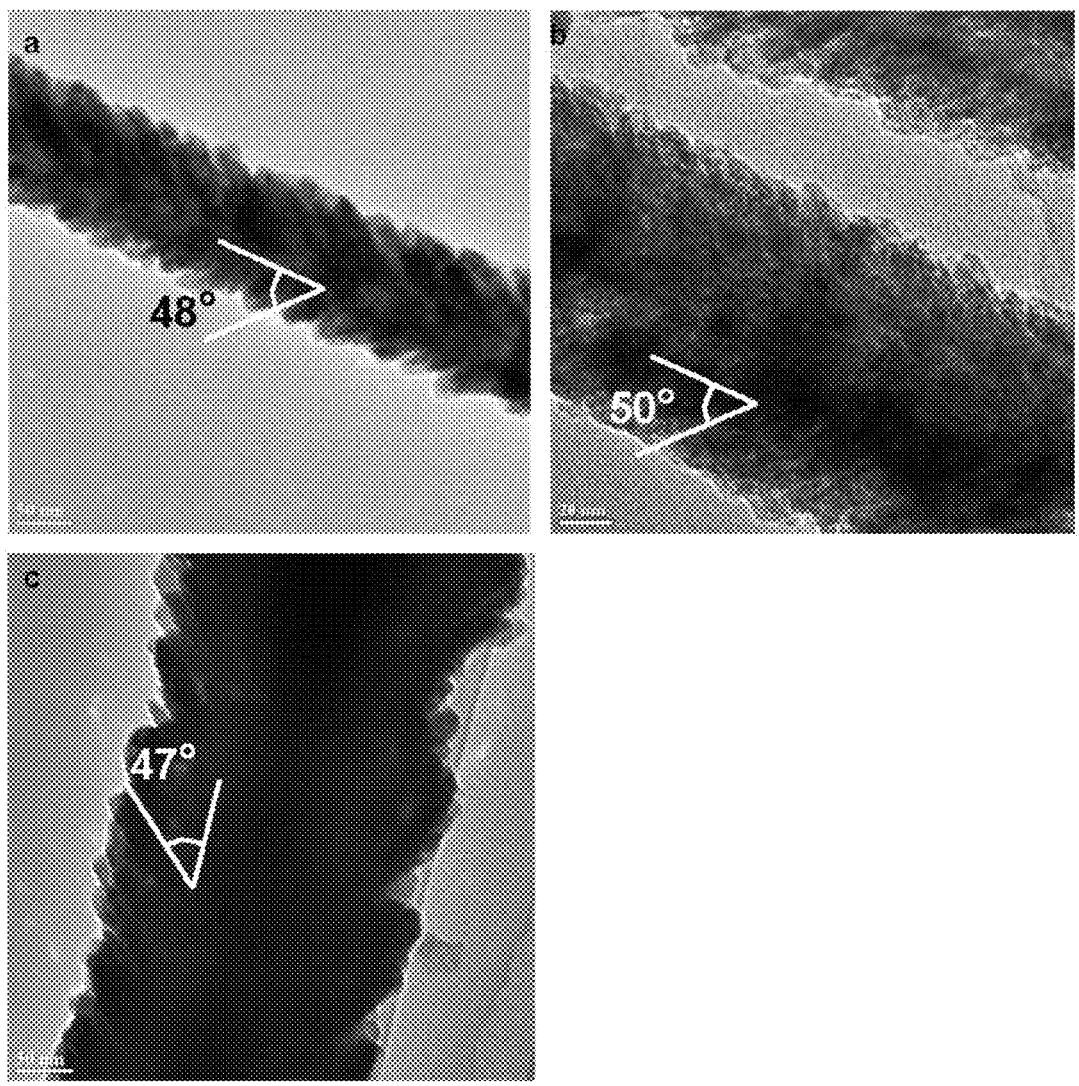
FIG. 5 contains TEM images of 'fir-tree' like morphology of Co on CuO nanowires showing a fixed angle of columnar Co grains on the core nanowires and Co was sputtered for (a) 20 min; (b) 30 min; (c) 50 min.
Figure 6:
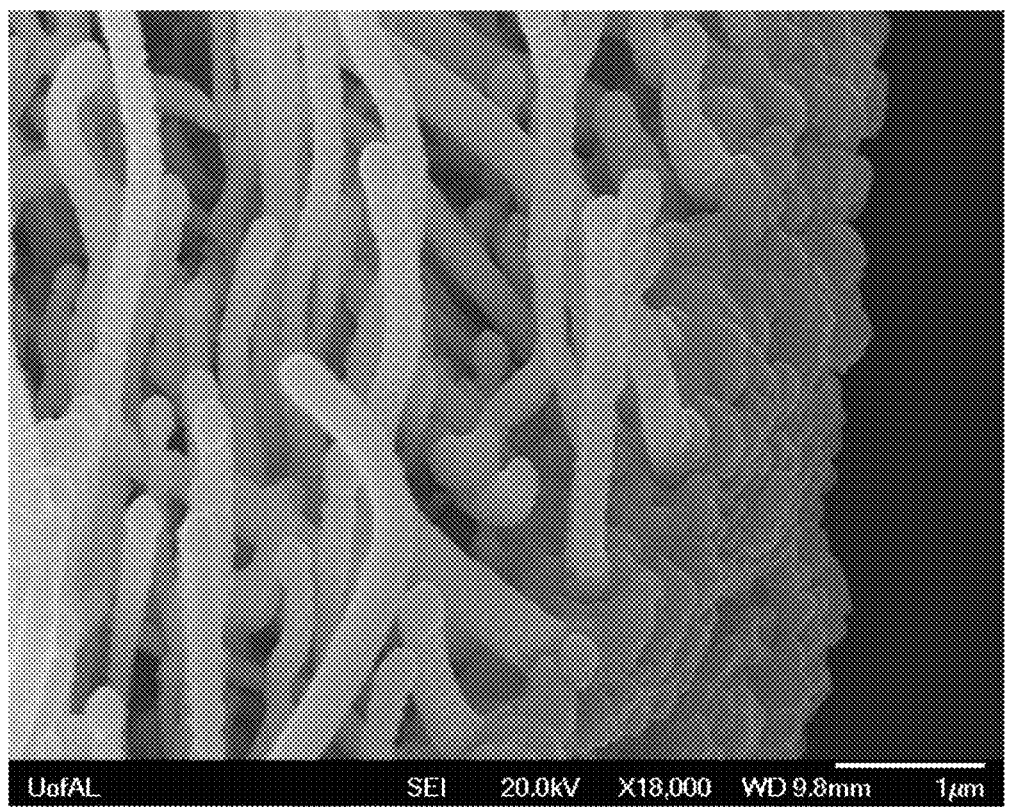
FIG. 6 contains SEM images of sample #6A (Table 1) showing fir-tree Co coating on CuO nanowires. It can be seen that this coating is uniform, columnar grains are facing up against the incident Co direction in the sputtering process, and Co is present all around the core CuO nanowires.

Nanoscale Res. Lett. 2011, 6, 598). Standing CuO—Co nanowire heterostructures were observed at different Co sputtering durations (1 to 50 min, FIG. 4a-f). There were some bent nanowires present at longer sputtering durations (>20 min) The bending angle of the nanowire (typically near the tip) increased from ~12-39° for 20 min to ~23-78° for 50 min (FIG. 3). This bending could be attributed to the force (or rate of change of momentum) with which incident Co species impinged onto nanowire tips and nearby regions (Shen, Y.; Hong, J. I.; Peng, Z.; Fang, H.; Zhang, S.; Dong, S.; Snyder, R. L.; Wang Z. L. *J. Phys. Chem. C* 2010, 114, 21277-21280). Co loading and the stiffness of nanowire with time are evaluated below. The Co coating on CuO nanowires was dominantly amorphous with nanocrystalline domains of Co and its oxide (due to air exposure, FIG. 4). This amorphous phase formation depends on the sputtering conditions and crystal structure difference between CuO and Co (Noh, J. S.; Lee, M. K.; Ham, J.; Lee, W. *Nanoscale Res. Lett.* 2011, 6, 598), which resulted in anomalously fast diffusion and surface migration of the Co on the nanowire surface (Chen, L. J. *Mater. Sci. Eng. R* 2000, 29, 115-152). After a specific thickness of the amorphous Co deposited on the CuO nanowires, surface diffusion of the depositing Co species maybe suitably slow to allow for the formation of crystalline Co domains in the coating (FIG. 4) (Chen, L. J. *Mater. Sci. Eng. R* 2000, 29, 115-152). The morphological evolution of the Co coating on CuO nanowires as a function of sputtering duration is schematically illustrated in FIG. 4m. In first 10 min, the Co coating in the form of a thin shell with embedded nanoparticles (~7.6±2.1 nm) evolved, which beyond 10 min resulted in 'fir-tree' like coating with columnar and semicrystalline Co grains (FIGS. 4g-l). These columnar grains were inclined at an angle)(45-50° with respect to the CuO nanowire axis and the former were also tilted opposite to the direction of the incident depositing Co in the sputtering process (FIG. 5 and FIG. 6).

Figure 7:
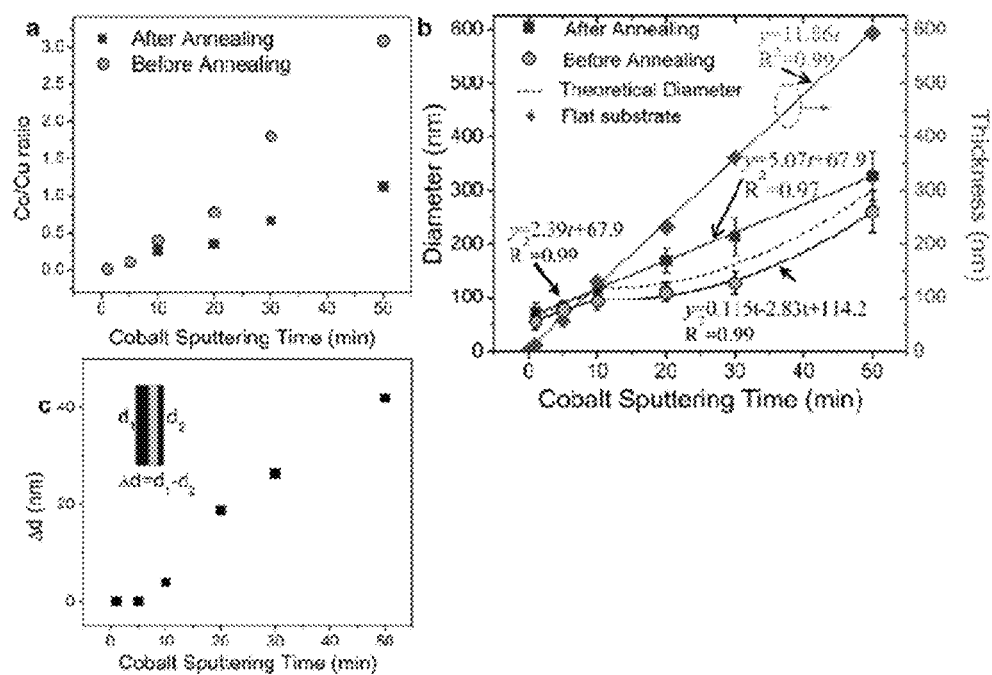
FIG. 7 contains plots showing (a) Co content, (b) nanowire heterostructures diameter, and (c) nanowire self-shadowing effects as a function of Co sputtering duration. Co/Cu atomic ratio in (a) was estimated using EDS of CuO—Co nanowire heterostructures before and after air annealing. (c) shows the Co shell thickness difference (shadowing effect, Δd as shown in schematic in the inset) between two sides of core CuO nanowires before and after air annealing as a function of Co sputtering duration. Linear fit (diamonds, control sample) in (b) shows the thickness of the Co film on a flat $Si/SiO_2$ substrate as a function of Co sputtering duration.

Based on SEM, TEM, and EDS analyses, it was possible to measure the Co content and diameter of the CuO—Co nanowire heterostructures as well as nanowire self-shadowing effects, all of which increase/enhance with Co sputtering duration (FIG. 7). According to quantitative estimation, atomic ratio of Co to Cu on CuO nanowires (FIG. 7a) increased with deposition time of 0.01 (for t=1 min) to 1.124 (t=50 min), indicating 112.4 times increase and also demonstrates an ability to control the Co content on the nanowires. Average diameter of the nanowires after Co coating showed an increasing trend ranging from ~69.4±17.6 nm at 1 min to ~261.1±39.2 nm at 50 min sputtering duration (FIG. 7b). Linear trend in the diameter was only observed till 10 min; beyond this a quadratic polynomial fit was observed. The rate at which diameter of nanowires increases as a function of sputtering duration is governed by two fundamental mechanisms (Gilmer, G. H.; Huang, H.; Roland, C. *Mater. Sci.* 1998, 12, 354-380; Martin, L. W.; Chu, Y. H.; Ramesh, R. *Mater. Sci. Eng. R.* 2010, 68, 89-133): 1) Stranski-Krastanov (SK) near-equilibrium mode for first 10 min of sputter deposition at a rate of ~2.39 nm/min and 2) kinetic roughening of the nanowire surface at sputtering durations above 10 min leading to low surface diffusion rates and growth of columnar Co coatings. As shown in FIG. 4m, the presence of Co nanoparticles embedded within Co thin film on CuO nanowires (<10 min) suggests that SK mode was the dominant Co coating mechanism (Gilmer, G. H.; Huang, H.; Roland, C. *Mater. Sci.* 1998, 12, 354-380; Chung, B. X.; Liu, C. P. *Mater Lett.* 2004, 58, 1437-1440) and was assisted by significant surface diffusion of Co onto CuO nanowires. In the latter regime (10-50 min), a negligible initial growth rate (10 min<t<20 min) indicates the merging of clusters and grain boundary formation (Chen, L. J. *Mater. Sci. Eng. R* 2000, 29, 115-152; Gilmer, G. H.; Huang, H.; Roland, C. *Mater. Sci.* 1998, 12, 354-380; Kaune, G.; Ruderer, M. A.; Metwalli, E.; Couet, S.; Schlage, K.; Rohlsberger, R.; Roth, S. V.; Muller-Buschbaum, P. *ACS Appl. Mater. Interfaces,* 2009, 1, 353-360). As the growth rate increased (t>20 min), columnar grains emerged, indicative of low surface diffusion rates and dominating kinetic effects based on deposition and surface transport rates (Gilmer, G. H.; Huang, H.; Roland, C. *Mater. Sci.* 1998, 12, 354-380). The average width of columnar grains increased from ~18 nm to ~25 nm for 20 min to 50 min sputter deposition. The voids between the columnar grains (Petrov, I.; Barna, P. B.; Hultman, L.; Greene, J. E. *J. Vac. Sci. Technol. A* 2005, 21, S117-S128) grew smaller in size for longer sputtering duration (t=50 min) as this involved kinetic roughening of surface and facilitated grain boundary grooving (Gilmer, G. H.; Huang, H.; Roland, C. *Mater. Sci.* 1998, 12, 354-380).

Figure 2:
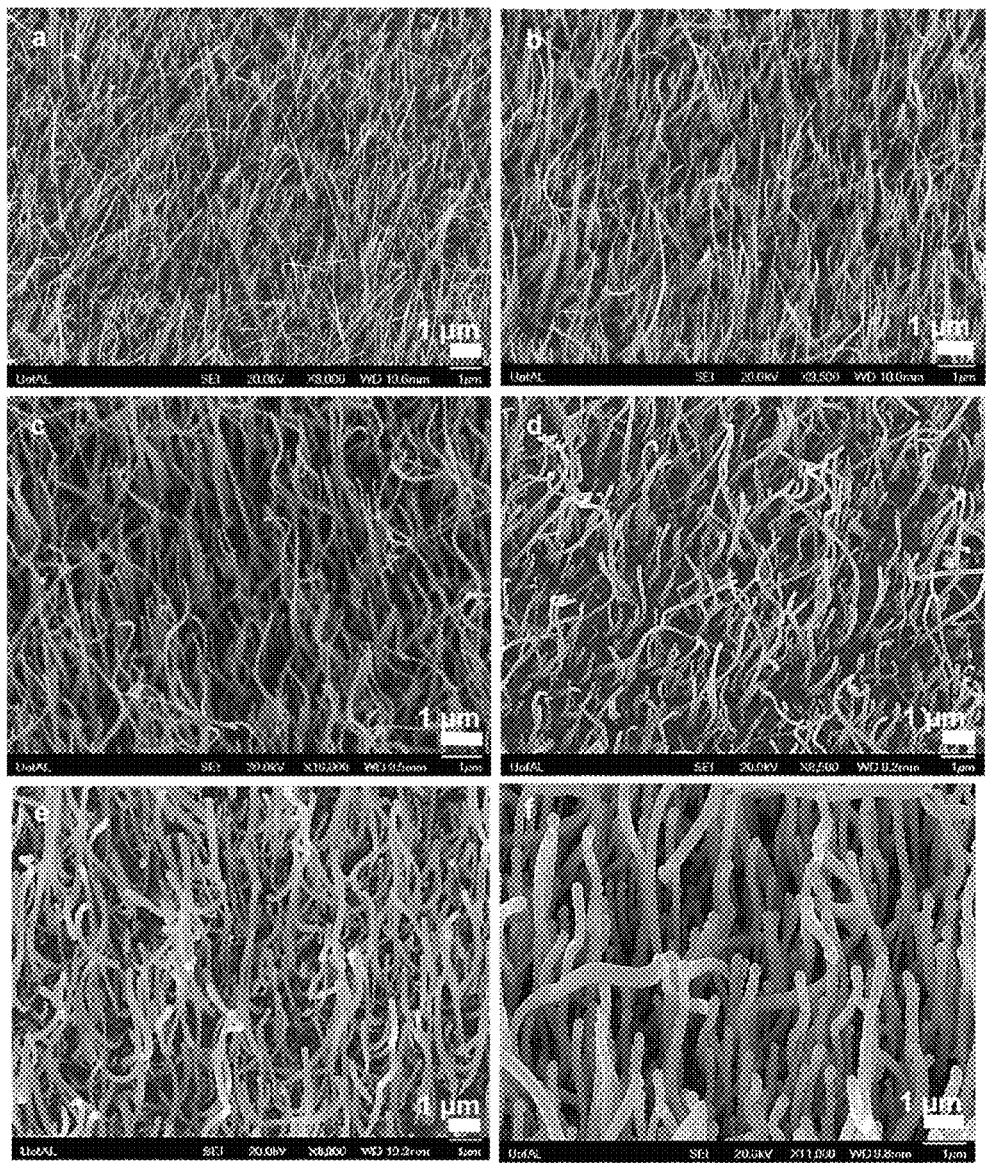
FIG. 2 contains SEM images of standing CuO—Co nanowire heterostructures fabricated after Co sputter deposition for (a) 1 min, (b) 5 min, (c) 10 min, (d) 20 min, (e) 30 min, and (f) 50 min (scale bar: 1 µm and samples were tilted at 20° in SEM).

The growth rates for Co coating around CuO nanowires were observed throughout to be significantly lower (~5 times) than that of the control sample (~11.85 nm/min, green color linear fit in FIG. 7b), which was prepared by sputtering Co on a flat substrate (Si/SiO$_2$ surface). This flat film deposition process exhibited a linear deposition trend as a function of deposition duration, which confirms that sputter deposition process on single crystalline substrates with high curvature (nanowires) is drastically different than that on a flat substrate. Another important observation in case of Co deposition on CuO nanowires was the shadowing effect due to the nanowires, which have been observed for other systems (Toku, Y.; Muraoka, M. *Nanosci. Nanotechnol. Lett.* 2010, 2, 197-202). The shadowing effect was estimated based on the difference (Δd, FIG. 7c and inset) of TEM-observed Co coating thickness on both sides of the nanowires. This Δd value increased from 0 to ~41.8 nm within 5 to 50 min of Co sputtering. This indicates that the nanowire surface facing the incident material captured more Co, making surface migration the dominant mechanism responsible for the complete diametrical and longitudinal coverage (FIG. 2 and FIG. 4).

In regard to the uniformity of Co coating around nanowires, a possible argument could be that the mean free path of the incident Co species (~2.57 cm, Supporting Information) was significantly (~9.63×10$^4$ times) greater than the spacing between CuO nanowires (~267 nm), the latter acting like a nanopore. Thus, Co species entering this nanopore likely encountered large number of collisions with the adjacent nanowire surfaces mimicking Knudsen diffusion process (Ohring, M. *Materials Science of Thin Films,* 2nd ed.; Academic Press: Waltham, 2001). This reasoning should indicate that only the tips and the nearby regions of the nanowires would be coated with Co. However, the microscopic observations contradicted this and showed uniform coating of nanowires with Co along its length (FIGS. 2, 4, and 6). Thus, other factors such as chemical potential of the nanowires and Co surface migration on nanowires play a role here (Eymery, G.; Biasiol, J.; Kapon, E.; Ogino, T. C. R. *Physique,* 2005, 6, 105-116; Granqvist, C. G. *Sol. Energ. Mat. Sol. C.* 2012, 99, 166-175). A possible mechanism could be that as soon as the Co species impacts the nanowire, it gained significant momentum along the nanowire axis. In addition, nanowire surface (curved) had a higher chemical potential than base substrate (flat) (Shi, W.;

Chopra, N. J. *Nanopart Res.* 2011, 13, 851-868), which enhanced surface migration and led to Co coating along the overall length of nanowires.

To understand this, it is the effect material surface migration on the nanowire surface was evaluated. Thus, further theoretical analysis was conducted. Consider at time t=t, incident Co flux (or momentum vector, $P_{incident\ Co}$) was perpendicular to the Co target and had an angle of θ (nanowire tilting angle) with the longitudinal direction of CuO nanowire (FIG. 8a). The following assumptions were made: 1) The mass of the nanowire at t=t was $m_{CuO/Co}$ and was a summation of mass of CuO nanowire and the deposited Co. 2) The mass of one unit of incident Co in the incoming flux (Φ=number of Co species per nanowire per second) was $m_{Co}$ and the sticking coefficient was a (Li, C.; Hsieh, J. H. *Thin Solid Film* 2002, 475, 102-108). To simplify the calculations, average value of a for Co species throughout the sputter deposition process was considered to be ~0.75 (Mahieu, S.; Aeken, K. V.; Depla, D.; Smeets, D.; Vantomme, A. *J. Phys. D: Appl. Phys.* 2008, 41, 152005). 3) The incident Co flux was uniformly impinging on the nanowire surface and further divided into two components; First component is due to the sticking coefficient (α), which accounted for the fraction of actual Co species being absorbed/deposited. These Co species would still have a velocity $V_{surface}$ (surface migration velocity, situation (1) in FIG. 8a) along the nanowire longitudinal axis (y'). The second component is due to the desorbing Co species, which is assumed to undergo a purely elastic collision on nanowire at an incident angle θ, same as nanowire tilting angle (pure reflection situation, situation (2) in FIG. 8a). The fraction of these species corresponds to 1−α (reflecting coefficient). 4) The base of the CuO nanowire is assumed to be anchored on the substrate. Number of Co species per nanowire per second (Φ) was derived using flat film calibration data (FIG. 7b). Thickness (w) of flat film was fitted as given by Eq. 1:

$$w = 11.86t \quad (1)$$

where t (min) is the sputtering duration. This resulted in total deposition flux of ~0.197 nm/s. If individual nanowire is assumed to be perfect cylindrical geometry with average diameter of ~68 nm, then the incident depositing flux (volume) of Co on the cross-section of CuO nanowire (~4000 nm²) is 788 nm³/s per nanowire. So, the estimated value of Φ(number of Co species per second per nanowire) was ~7.14×10⁴. Further assuming that kinetic energy of Co species (in atomic state) is ~7.5 eV (Stanton, H. E. *J. Appl. Phys.* 1960, 31, 678-683), then the incident kinetic energy ($E_k$), depositing mass ($m_{Co}$), and impinging velocity ($V_{Co}$) were calculated as follows:

$$E_k = 1/2 m_{Co} V_{Co}^2 = 7.5\ eV = 7.5 \times 1.6 \times 10^{-19}\ kg/m^2 \cdot s^2$$

$$m_{Co} = 9.8 \times 10^{-26}\ kg = 9.8 \times 10^{-23}\ g$$

$$V_{Co} \approx 156\ m/s$$

Based on all the above assumptions and calculations, the overall mass of Co species depositing on individual CuO nanowire was $m_{Co}\alpha\Phi$ (g/s) and the momentum of incident Co species per CuO nanowire was $\alpha\Phi\sqrt{2m_{Co}E_k}$. Thus, by conservation of momentum (FIG. 8a), the following equation is obtained (bold letters denote vectors):

$$P_{incident\ Co} = P_{Co\ on\ CuO\ nanowire\ surface} + P_{Co\text{-coated}\ CuO\ nanowire} + P_{Co\ desorbed} \quad (2)$$

Balancing components on x'-axis (nanowire transverse axis, FIG. 8a), $$\Phi m_{Co} V_{Co} \sin\theta = (m_{CuO/Co} + \alpha\Phi m_{Co}) V_{x'} + (1-\alpha)\Phi m_{Co} V_{Co} \sin\theta \quad (3)$$

Balancing components on y'-axis (nanowire longitudinal axis, FIG. 8a), $$\Phi m_{Co} V_{Co} \cos\theta = (m_{CuO/Co} + \alpha\Phi m_{Co}) V_{y'} + (1-\alpha)\Phi m_{Co} V_{Co} \cos\theta + m_{Co} V_{surface} \quad (4)$$

Using Eqs. 3 and 4 nanowire velocity components ($V_{x'}$ and $V_{y'}$) are estimated as follows:

$$V_{x'} = \frac{(\alpha-2)\Phi m_{Co} V_{Co} \sin\theta}{m_{CuO/Co} + \alpha\Phi m_{Co}} \quad (5)$$

$$V_{y'} = \frac{\alpha\Phi m_{Co} V_{Co} \cos\theta - \alpha\Phi m_{Co} V_{Surface}}{m_{CuO/Co} + \alpha\Phi m_{Co}} \quad (6)$$

This momentum conservation approach explains two aspects: a) displacement of nanowires like a hinged cantilever during the sputter deposition process, where $V_{x'}$ and $V_{y'}$ are the speeds at which this displacement takes place and b) migration of deposited Co species on the nanowire surface with velocity given by $V_{surface}$ on the x'-axis. Since it is assumed that the nanowire is anchored on the substrate, $V_{y'} \approx 0$ for a rigid nanowire (or nanowire is incompressible in y'-axis). The following relationship using Eq. 5 can be derived:

$$V_{surface} = V_{Co} \cos\theta \quad (7)$$

Eq. 7 indicates that if the nanowire was vertically aligned, then the surface migration velocity ($V_{surface}$) was the highest (~$V_{Co}$). Thus, as soon as the Co species impinged on the surface of the nanowire (at t=t), the former displayed a tendency to surface migrate along the nanowire length. This also explains the uniform coating on majority of the CuO nanowires because they were tilted by small angles (θ<5°) on the substrate. It is proposed that θ is also related to the nanowire motion (hinged cantilever-like bending or 'swaying') in the x' direction due to $V_{x'}$ velocity component (Eq. 5). Knowing that the nanowire diameter is a function of the sputtering duration (t, FIG. 7b), it is possible to estimate $m_{CuO/Co}$. The diameter of the nanowires (d) could be written as:

$$d = \begin{cases} 2.39t + 67.9, & 0 < t < 10 \\ 0.115t^2 - 2.83t + 114.2, & 10 \le t \le 50 \end{cases} \quad (8)$$

$m_{CuO/Co}$ is given by:

$$m_{CuO/Co} = \rho_{Co} Vol_{Co} + \rho_{CuO} Vol_{CuO} \quad (9)$$
$$= \rho_{Co}\pi[d^2 - d_0^2]L/4 + \rho_{CuO}\pi d_0^2 L/4$$
$$= \pi L/4(\rho_{Co}(d^2 - d_0^2) + \rho_{CuO} d_0^2)$$

where ρ and Vol indicate density and volume of the species (Co or CuO), d is the instantaneous diameter of the nanowire coated with Co, $d_o$ is the initial diameter of CuO nanowire, and L is the length of CuO nanowire. As observed through SEM analysis L~5 μm, average $d_0$~68 nm, and the unit of density is g/nm³ (density of Co: 8.9×10⁻²¹ g/nm³, density of CuO: 6.3×10⁻²¹ g/nm³), $m_{CuO/Co}$ (g) is estimated as:

$$m_{CuO/Co} = 3.49 \times 10^{-17}(d^2 - 1387) \quad (10)$$

Using Eqs. 8 and 10, $m_{CuO/Co}$ as a function of sputtering duration (t) is given as:

$$m_{CuO/Co} = \begin{cases} 3.49 \times 10^{-17}[(2.39t + 67.9)^2 - 1387], & 0 < t < 10 \\ 3.49 \times 10^{-17}[(0.115t^2 - 2.83t + 114.2)^2 - 1387], & 10 \leq t \leq 50 \end{cases} \quad (11)$$

Further, using Eqs. 5 and 11, $V_{x'}$ as a function of, both, t and θ are shown in FIG. 8b and given below:
For 0<t<10 min (or 600 sec)

$$V_{x'} = \frac{(\alpha - 2)\Phi m_{Co}V_{Co}\sin\theta}{3.49 \times 10^{-17}[(2.39t + 67.9)^2 - 1387] + \alpha\Phi m_{Co}} \quad (12)$$

For 10 min (or 600 sec) ≤ t ≤ 50 min (or 3000 sec)

$$V_{x'} = \frac{(\alpha - 2)\Phi m_{Co}V_{Co}\sin\theta}{3.49 \times 10^{-17}[(0.115t^2 - 2.83t + 114.2)^2 - 1387] + \alpha\Phi m_{Co}} \quad (13)$$

FIG. 8b indicates that when θ is very high (>60°), the nanowire velocity ($V_{x'}$) was the highest (~1.0×10⁻² m/s) and this velocity decreased with Co sputtering duration. This velocity ($V_{x'}$) was very low (between 0 and ~2×10⁻³ m/s) throughout the sputtering process for low θ (<10°). Thus, nanowire vertical-alignment was the key in preventing nanowire bending and swaying (based on $V_{x'}$ dependence) as well as in-turn minimizing the self-shadowing effects. In addition, higher $V_{x'}$ at larger θ implies that nanowires have a greater tendency to bend or sway. This could be the reason for observing large nanowire bending angles (FIG. 3) and also suggest that the nanowires were not 100% vertically-aligned and some nanowires were at greater tilt angles (>>5°) on the substrate.

Assuming that the nanowire sways like a hinged cantilever during the sputtering process based on velocity, diameter, and mass estimations, it was possible to evaluate the stress distribution of the nanowires as a function of Co sputtering duration (t) and θ. The Young's modulus for pure CuO nanowires and Co coating as well as Possion's ratio for CuO nanowires were assumed as ~150 GPa, ~100 GPa, and ~0.3, respectively (Tan, et al., *Appl. Phys. Lett.* 2007, 90, 163112; Zhang, et al., *Nanotechnology,* 2009, 20, 365706). Thus, Young's modulus, based on effective flexural rigidity, of heterostructured nanowire is given as (Chueh, et al., *Adv. Mater.* 2007, 19, 143-149; Chen, et al., *Phys. Rev. Lett.* 2006, 96, 075505):

$$EI = E_{CuO}I_{CuO} + E_{Co}I_{Co} \quad (14)$$

where E and I denotes Young's modulus and moment of inertia of individual component. The latter is given as: $I_{CuO} = (d_{CuO})^4/12$ and $I_{Co} = [(d_{CuO/Co})^4 - (d_{CuO})^4]/12$, where $d_{CuO}$ is ~68 nm and $d_{CuO/Co}$ is given Eq. 8. Young's modulus of nanowire heterostructures vs. t (FIG. 8c) showed steep decline for the initial 10 min and showed a gradual decline beyond this duration with stabilization after 40 min. This implies that the Young's modulus of pure Co (~100 GPa) dominates the composite nanowire with thicker Co coating.

This calculation is further utilized in finite element method (FEM) analysis as described next using ELMER® software.

Figure 8:
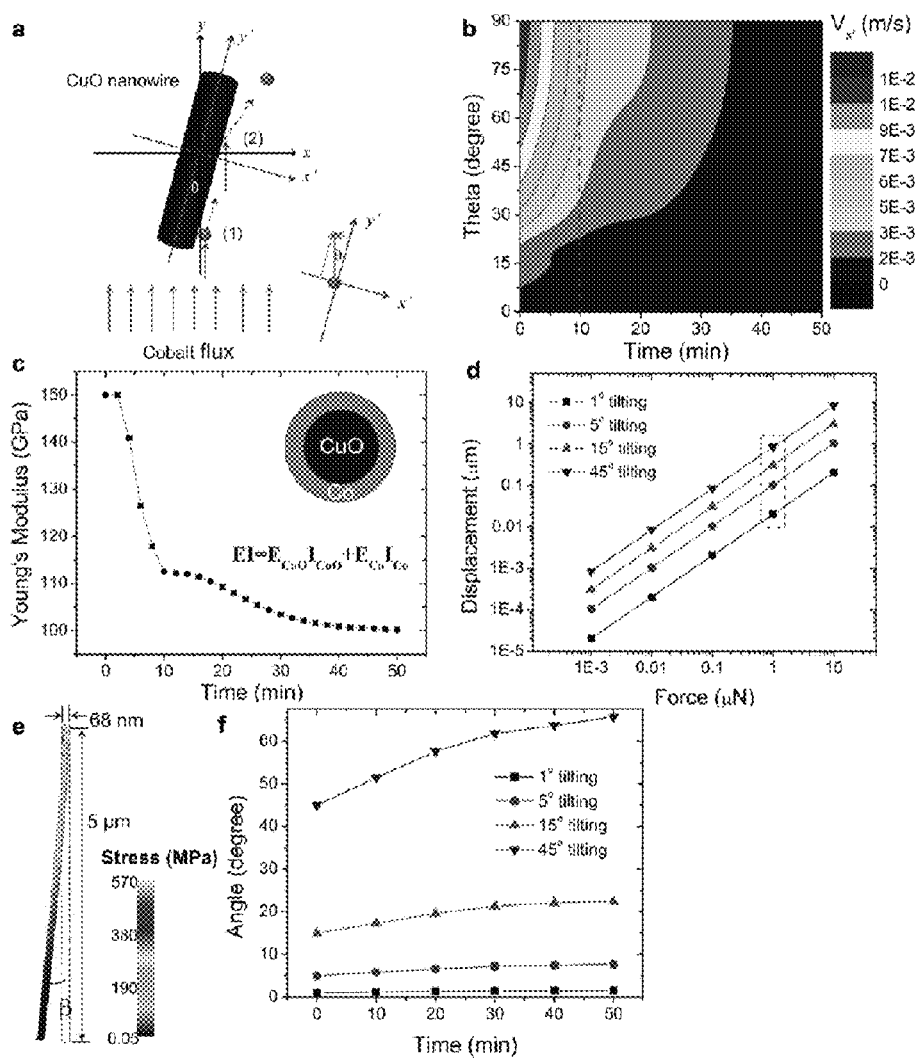
FIG. 8(a) is a schematic illustrating Co species impinging onto CuO nanowire in the sputter deposition process.
FIG. 8(b) is a 3-D plot showing dependence of $V_{x'}$ with respect to Co sputtering duration and nanowire tilting angle (θ).
FIG. 8(c) shows the Young's modulus of CuO—Co nanowire heterostructures as a function of sputtering duration.
FIG. 8(d) is a FEM analysis plot of displacement of pure CuO nanowire vs. impinging force and the derived image showing (e) the bending and von Mises equivalent stress distribution in the nanowire.
FIG. 8(f) is a FEM analysis plot for nanowire heterostructure swaying angle (bending) vs. Co sputtering duration. The force in (f) was assumed to be 1µN as shown by dotted rectangle in (d).
Figure 9:
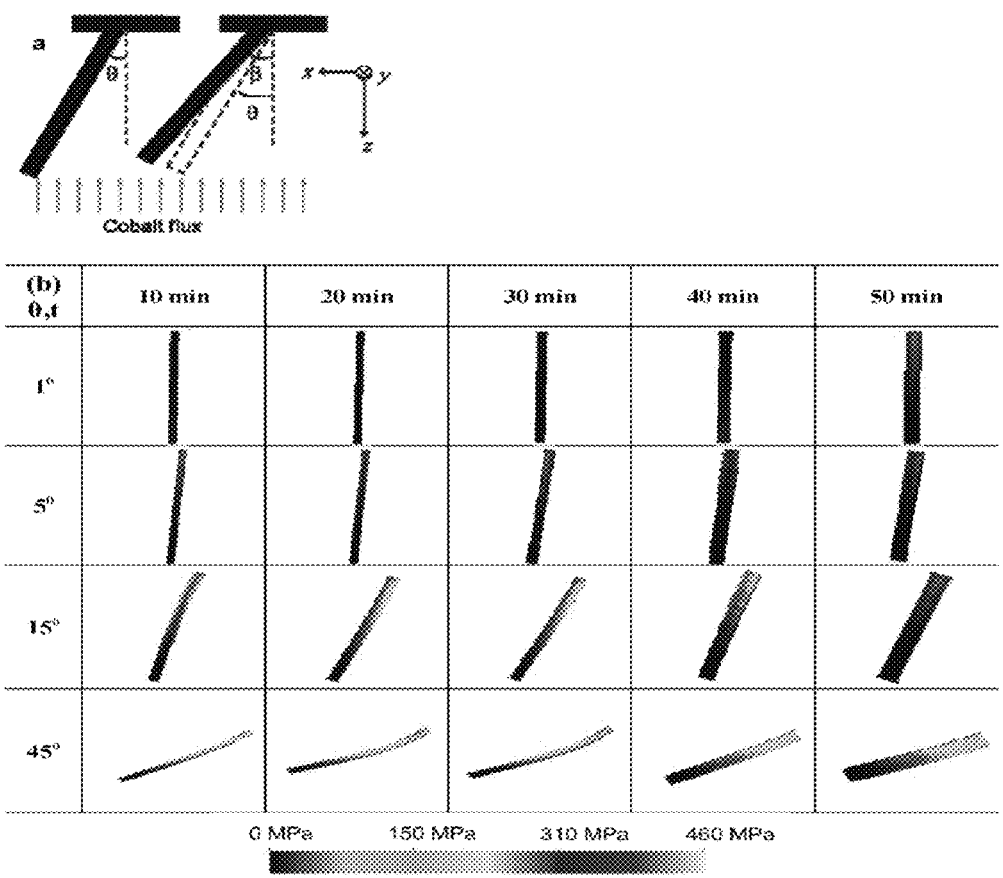
FIG. 9(a) is a schematic indicating the bending or swaying angle of the CuO—Co nanowire heterostructures as the Co deposits on the nanowire surface. This is further simulated in FIG. 9(b) (derived from FEM analysis) and shows the von Mises equivalent stress distribution and bending (β) of nanowires as a function of nanowire tilting angle (θ) and Co sputter deposition duration. Geometrical parameters could be visualized in schematics given in FIG. 8a and e.

The FEM mesh was created using GID 10.2® software with 0.15 mesh size. In order to evaluate nanomechanical aspects of CuO—Co nanowire heterostructures, the first step was to select suitable impinging force of the Co species during the sputtering process. FEM analysis resulted in linear relationship between the impinging force and nanowire displacement or swaying (FIG. 8d). This also showed that at a constant force, higher θ resulted in larger nanowire displacements. Thus, selecting 1 μN impinging force simplified subsequent calculations as higher forces would correspond to multiplying factors based on FIG. 8d. This force value is also consistent with other nanowire systems (Shen, et al., *J. Phys. Chem. C* 2010, 114, 21277-21280). A representative von Mises equivalent stress distribution in the pure CuO nanowire corresponding to 5° (=θ) nanowire tilt and 1 μN force is shown in FIG. 8e. This force resulted in nanowire swaying angle (β, FIG. 8e and FIG. 9a). The maximum von Mises equivalent stress distribution near the hinged location was calculated to be as high as ~400 MPa. The Young's modulus of CuO—Co nanowire heterostructures was obtained from FIG. 8c. As the Co sputter deposition on CuO nanowires proceeded, FEM calculations (FIG. 8f) indicated that this swaying angle θ3) essentially remained the same throughout the sputtering process for small θ (<15°) but showed an increasing trend, if the latter was greater than 15°. For example, CuO nanowire tilted at 45° would be further swayed and bent by 65° after 50 min of sputtering duration. This bending is also responsible for the enhanced shadowing effects (FIG. 7c). At the same time, von Mises equivalent stress distribution intensified in the heterostructured nanowires with increasing sputtering duration and η (FIG. 9). It is estimated that the stress was concentrated at the root of nanowires (Asthana, et al., *Nanotechnology,* 2011, 22, 265712), which might cause the failure/breaking of nanowires if the impinging force or θ is large enough and Co sputtering duration is low (thin Co coating, FIG. 9b). However, the maximum von Mises equivalent stress was calculated to be as high as ~200 MPa (for θ=45° and t=50 min), which is two times lower than the pure CuO nanowire. This is also obvious as the CuO—Co nanowire heterostructures have lower Young's modulus (lower stiffness) as compared to pure CuO nanowires (FIG. 8c). Assuming that the plastic yielding stress for the nanowires is in gigapascal range (Zhang, et al., *Nanotechnology,* 2009, 20, 365706), this stress distribution (FIG. 9b) suggests that CuO—Co nanowire heterostructures will be difficult to yield as compared to pure CuO nanowires. The microscopic observations also showed negligible number of fractured nanowires and thus, strengthen this argument. Overall, these calculations and theoretical approach clearly show the role of perfect vertical alignment (θ=0) in CuO nanowires in minimizing the yielding and bending of nanowires as well as shadowing effects (FIG. 8 and FIG. 9) during the Co sputtering process. This will further allow for fabrication of stable CuO—Co nanowire heterostructures.

Fabrication of CuO—Co₃O₄ Nanowire Heterostructures and their Morphological and Structural Evolution The abovementioned theoretical and experimental understanding for CuO—Co nanowire heterostructures help form a uniform, mechanically stable, and controlled CuO—Co₃O₄ nanowire heterostructures formation after air annealing process (Table 1, sample series B). Due to the relatively higher melting points of Co and CuO than the annealing temperature, no physical damage, fusion, and melting was observed (Haynes, W. M. *CRC handbook of chemistry and*

Figure 10:
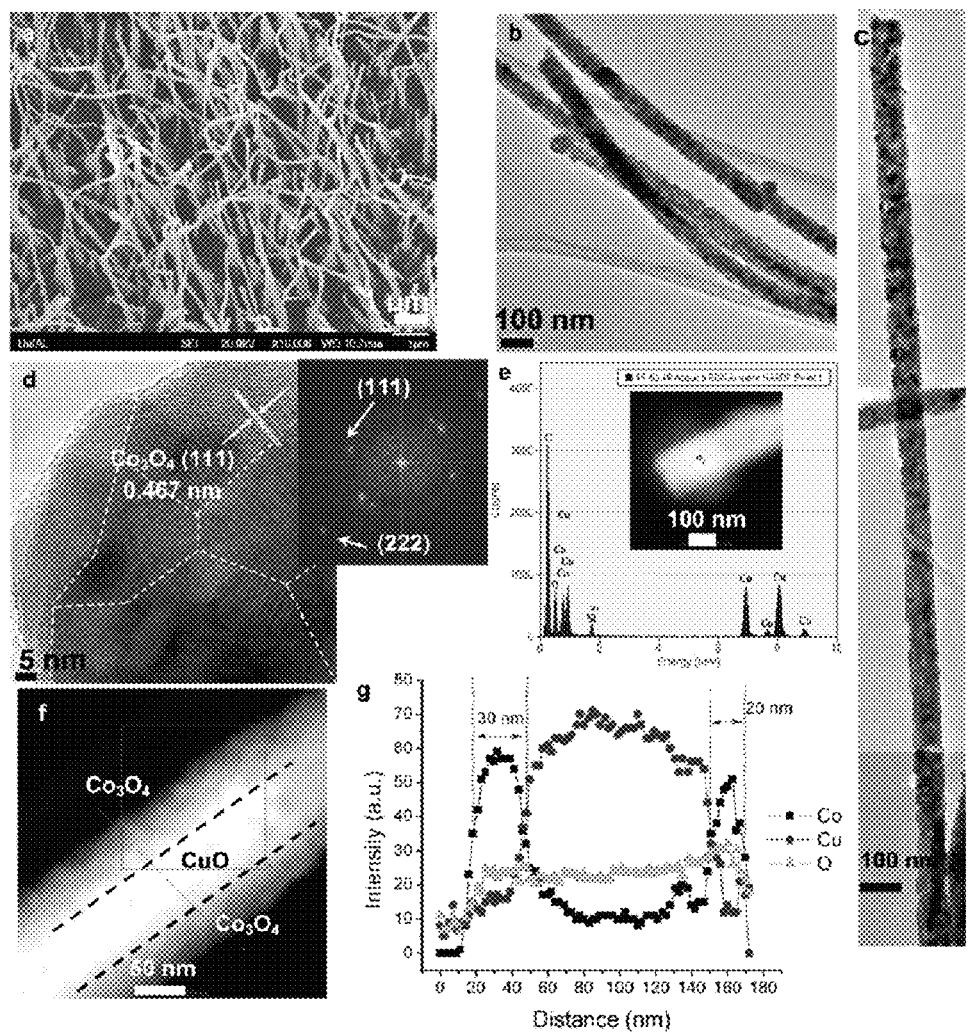
FIG. 10(a) is a SEM image of standing CuO—$Co_3O_4$ nanowire heterostructures synthesized for conditions consistent with sample #3B.
FIGS. 10(b) and (c) are TEM images showing that CuO nanowires coated with $Co_3O_4$ after air annealing process.
FIG. 10(d) is a HRTEM image with dotted lines indicating grain boundary and FFT image for the $Co_3O_4$ coating.
FIG. 10(e) is a typical spot EDS analysis, (f) STEM-mode image, and (g) EDS line profile of the $CuO$—$Co_3O_4$ nanowire heterostructures.
Figure 11:
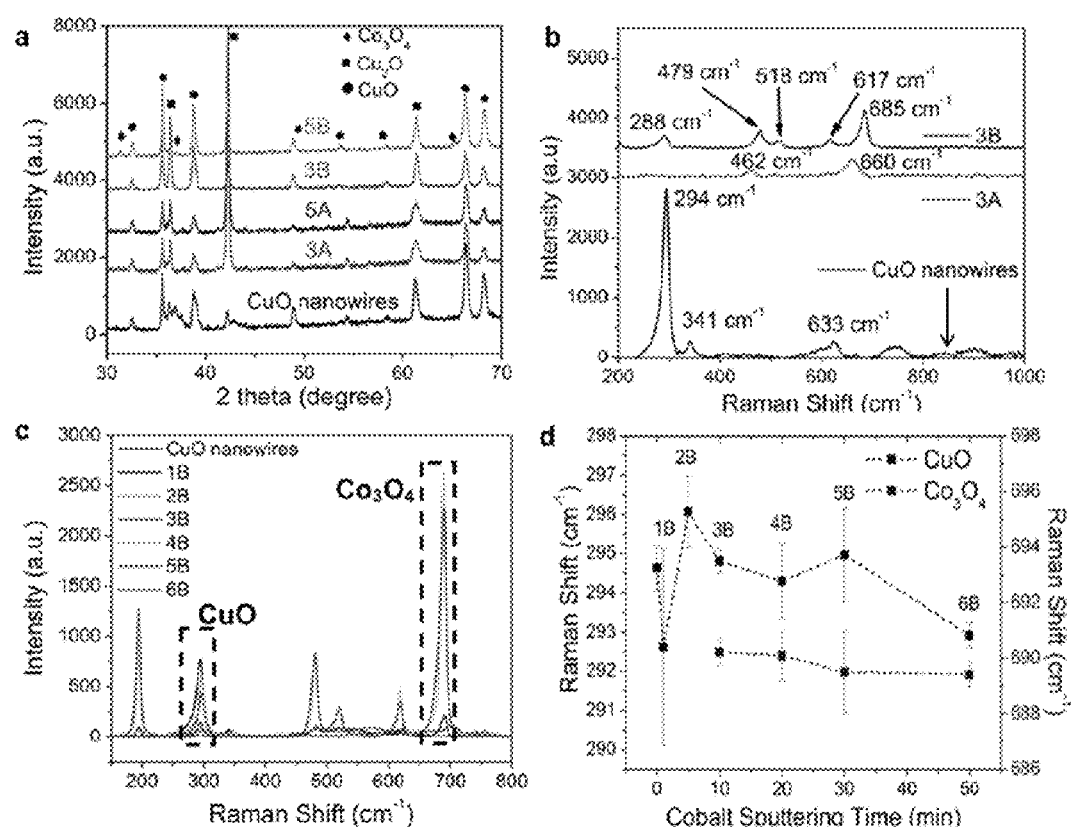
FIG. 11(a) are XRD patterns and (b) Raman spectra for CuO nanowires as well as CuO—Co and $CuO$—$Co_3O_4$ nanowire heterostructures (sample #3 and #5, Table 1).
FIG. 11(c) is a comparison of Raman spectra and (d) Raman peak locations for CuO (~294 $cm^{-1}$, dotted box in (c)) and $Co_3O_4$ (~700 $cm^{-1}$, dotted box in (c)) for various $CuO$—$O_3O_4$ nanowire heterostructures (Sample #1B-6B, Table 1) corresponding to different Co sputtering durations.

*physics*. CRC press: Boca Raton, 2012). As seen in the representative sample (Sample #3B, Table 1, FIGS. 10a-d), nanowires were completely coated with a polycrystalline $Co_3O_4$ shell (lattice spacing in FIGS. 10b-d). Several STEM-mode EDS analysis and line profiles showed that both CuO and $Co_3O_4$ components were structurally and chemically intact within the nanowire heterostructures (FIGS. 10e-g). The shadowing effects with one side of CuO nanowire showing higher $Co_3O_4$ shell thickness than the other (Δd~10 nm) was also identified using line profiles and followed a similar trend as non-annealed samples (FIG. 7c). XRD (FIG. 11a) showed the phase and crystallinity of $Co_3O_4$ after air annealing process. Due to partially crystallized or amorphous Co coating and limitations in XRD resolution, it was not possible to observe Co in non-annealed samples (FIG. 11a). Post-annealing XRD for the nanowire heterostructures showed (FIG. 11a) several new peaks at 31.11°, 36.59°, 65.17° corresponding to (200), (311), and (400) planes of $Co_3O_4$ (JCPDS 65-3103). Raman spectra confirmed the phases present in the nanowires at various stages of processing (FIG. 11b). In FIGS. 11b-a, peaks at 294 $cm^{-1}$, 341 $cm^{-1}$ and 633 $cm^{-1}$ could be ascribed to $A_g$, $B_g^1$ and $B_g^2$ modes of CuO nanowires (Chou, et al., *Appl. Surf Sci.* 2008, 254, 7539-7543). After coating with Co, new Raman peaks corresponding to the oxides of Co (due to air exposure) emerged, consistent with the TEM observations (FIG. 4). After air annealing, Raman peaks consistent with $Co_3O_4$ were observed at 288 $cm^{-1}$ ($F_{2g}$), 479 $cm^{-1}$ ($E_g$), 518 $cm^{-1}$ ($F_{2g}$), 617 $cm^{-1}$($F_{2g}$), 685 $cm^{-1}$($A_{1g}$) (Tyczkowski, et al., *Thin Solid Film* 2007, 515, 6590-6595). The absence of 600 $cm^{-1}$ can also confirm the good crystallization of $Co_3O_4$ within the heterostructure (Chou, et al., *Appl. Surf Sci.* 2008, 254, 7539-7543). Compared with the standard spectra, the Raman peaks were slightly shifted (~1-3 $cm^{-1}$) and could be attributed to the nanostructured morphology, lattice strains, presence of heterojunctions, and/or sample variability (FIG. 11c,d) (Gouadec G.; Colomban P. *Prog. Cryst. Growth Charact. Mater.* 2007, 53, 1-56). Raman depth profile (FIG. 12a) on CuO—$Co_3O_4$ nanowire heterostructures showed $CO_3O_4$ peaks along the entire length of the nanowires (FIG. 12a). A minor peak shift (~1.1 $cm^{-1}$, FIG. 12b) corresponding to the strongest $Co_3O_4$ ($A_{1g}$) Raman peak could be due to the stresses in the polycrystalline $Co_3O_4$ shell along the nanowire length (Tyczkowski, J.; Kapica, R.; Lojewska, J. *Thin Solid Film* 2007, 515, 6590-6595). Raman peak intensity was lowered by ~250 units (FIG. 12c) along the length of the nanowire. This lowering in peak intensity could be due to a sample-induced spherical aberration (Maruyama, Y.; Kanematsu, W. *J. Appl. Phys.* 2011, 110, 103107).

Figure 13:
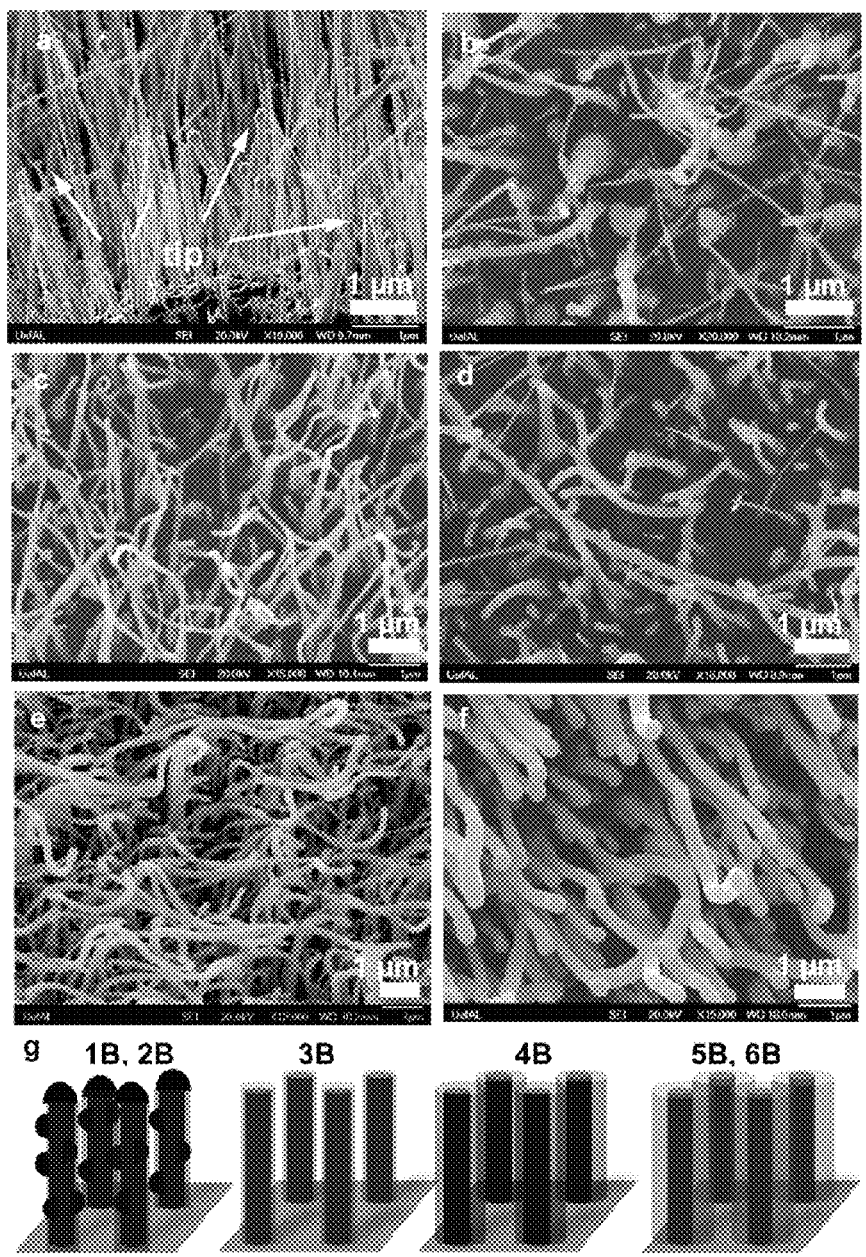
FIG. 13 contains SEM images of standing $CuO$—$Co_3O_4$ nanowire heterostructures fabricated after air-annealing (for 10 hrs) and corresponding to Co sputter deposition for (a) 1 min, (b) 5 min, (c) 10 min, (d) 20 min, (e) 30 min, (f) 50 min sputtering (scale bar: 1 μm). (g) Schematic illustrating morphogical evloution of $Co_3O_4$ on core CuO nanowires after annealing.
Figure 14:
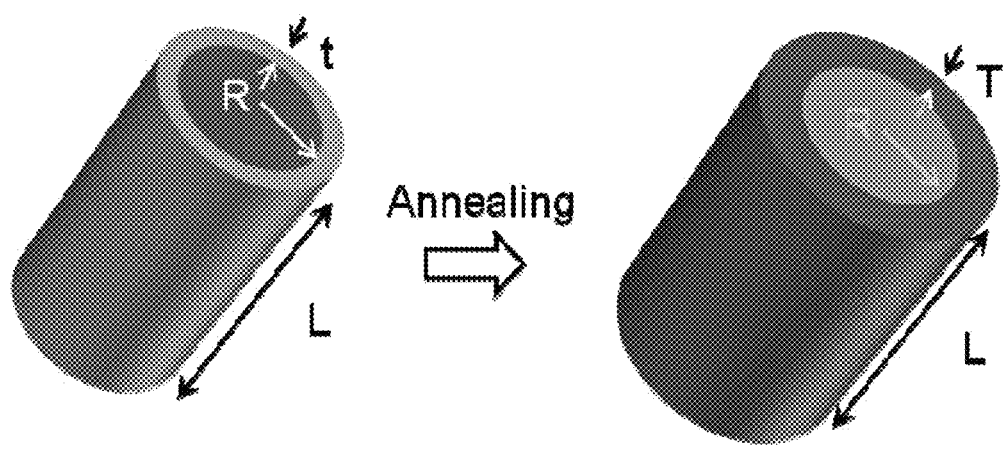
FIG. 14 is a schematic showing the geometrical parameters of the nanowire heterostructures before and after air annealing. Theoretical calculation of $Co_3O_4$ shell thickness formation after air annealing and assuming that complete oxidation/conversion of Co on CuO nanowires take place.
Figure 15:
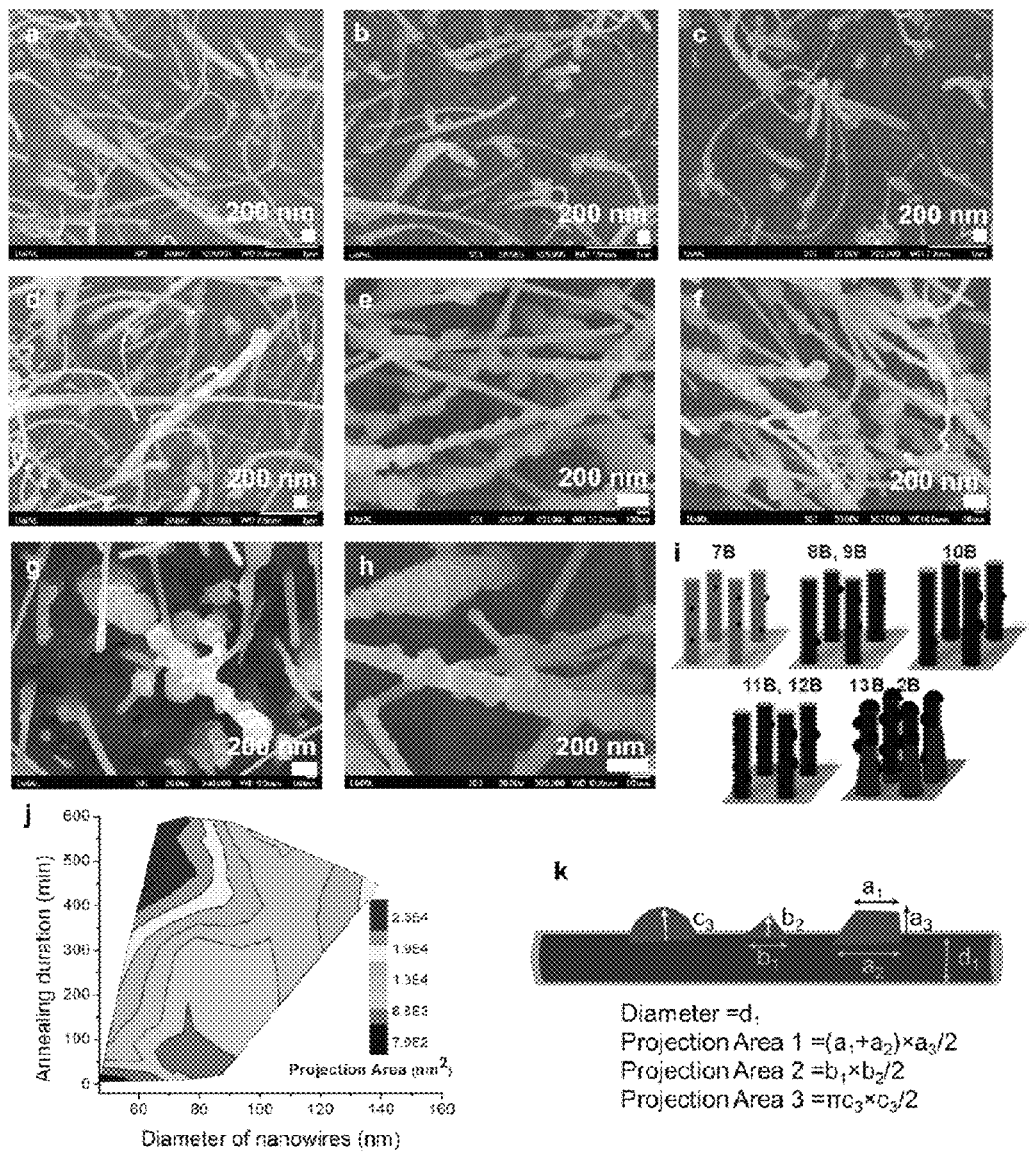
FIG. 15 contains SEM images of standing $CuO$—$Co_3O_4$ nanowire heterostructures after air annealing of CuO—Co nanowire heterostructures (Sample #2A, #7A-13A, Table 1) for (a) 5 min, (b) 10 min, (c) 20 min, (d) 60 min, (e) 2.5 hrs, (f) 5 hrs, (g) 7.5 hrs, and (h) 10 hrs, respectively (Scale bar: 200 nm). (i) Schematic representing morphological evolution of $Co_3O_4$ on core CuO nanowires as a function of air annealing duration. (j) Contour plot showing $Co_3O_4$ nanoparticle projection area as a function of annealing time and diameter of nanowire heterostructures. (k) Schematic illustrating the approach to calculate nanoparticles projection area.

The annealing of CuO—Co nanowire heterostructures corresponding to different sputtering duration (samples #1B-6B, Table 1, FIG. 13) resulted in standing CuO—$Co_3O_4$ nanowire heterostructures with controlled Co content. FIG. 13 shows the morphological evolution of $Co_3O_4$ on CuO nanowires. Sample #1B and #2B (Table 1) consistent with shortest Co sputtering duration of 1 min and 5 min, respectively, resulted in $Co_3O_4$ nanoparticles formation within a thin film of $Co_3O_4$ (<1-2 nm). Interestingly, sample #1B showed $Co_3O_4$ nanoparticle decoration at the nanowire tip indicating that surface migration during annealing drove the material towards low chemical potential regions of the nanowires (flat tips) (Shi, W.; Chopra, N. *J. Nanopart Res.* 2011, 13, 851-868). The nanowire heterostructures diameter vs. Co sputtering duration after air annealing process showed a linear trend (FIG. 7b). Theoretical estimation of this diameter, assuming that all the Co on the nanowires completely converted into $Co_3O_4$ shell (FIG. 14), resulted in a trend (FIG. 7b, dotted line) similar to before annealing. So, the experimental observation of the linear trend for CuO—$Co_3O_4$ nanowire heterostructures diameter with rate ~2 times faster as compared to theoretically calculated diameter suggests that the surface diffusion of the material was aided by the incorporation of extra Co content. The contribution of the latter is attributed to the Co present at the roots of the nanowires (or on the substrate). It has been previously reported that the chemical potential effects of the nanowire surface as well as surface tension and surface charge of $Co_3O_4$ at the annealing temperatures play a dominant role. Furthermore, they also aid in migration of the material from the flat substrate to the nanowire surface when annealed for longer durations (Hill, et al., *Nano Lett.* 2011, 133, 18663-18672; Shi, W.; Chopra, N. *J. Nanopart Res.* 2011, 13, 851-868; Noh, J. S.; Lee, M. K.; Ham, J.; Lee, W. *Nanoscale Res. Lett.* 2011, 6, 598). It was observed that Co to Cu ratio (estimated using EDS, FIG. 7a) for CuO—$Co_3O_4$ nanowire heterostructures increased with Co content (sputtering duration) but was lower than non-annealed samples due to the oxidation of Co.

Figure 16:
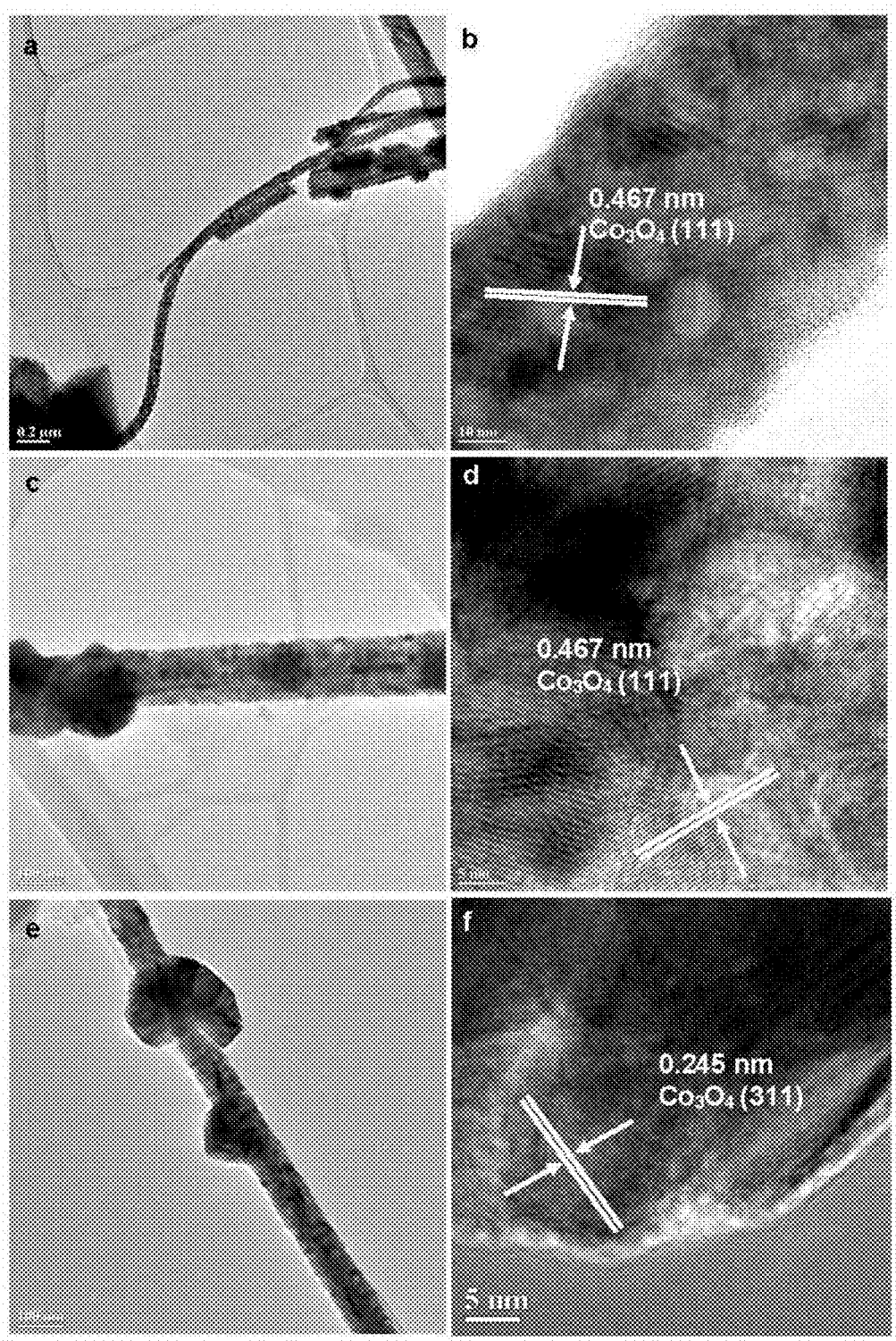
FIG. 16(a, b) are TEM images of sample #9B (5 min sputtering, 20 min annealing).

FIG. 15a-h shows CuO—$Co_3O_4$ nanowire heterostructures after air annealing for different durations (Samples #2B, #7B-13B, Table 1). The Co sputtering duration for these experiments was fixed at 5 min as these conditions resulted in a thin film of Co with embedded nanoparticles of the same on CuO nanowires. Thus, the effect of the annealing duration on these samples added to the understanding of the interface development and morphological evolution of $Co_3O_4$ on the CuO nanowires (Noh, et al., *Nanoscale Res. Lett.* 2011, 6, 598). As the annealing duration was increased (5 min to 10 hrs), $Co_3O_4$ evolved on CuO nanowires in the form of polycrystalline film coating with several faceted nanoparticles (FIG. 15i and FIG. 16). Annealing duration was plotted as a function of diameter of the nanowire heterostructures and the projection area of $Co_3O_4$ nanoparticles (FIG. 15j and Table 2). The latter implies a 2-D projection, which is a better indicator of size and shape of the nanoparticle (FIG. 15k). The average nanowire diameter was estimated only for those regions of nanowires that did not have any faceted nanoparticle growth and is observed to be constant, irrespective of the annealing duration (Table 3). The estimated projection areas of the nanoparticles formed were lower at smaller annealing durations (<2 hrs) than longer durations (FIG. 15j). Only nanowires with diameters less than ~90 nm incorporated the largest possible sizes (or projection areas) of the nanoparticles. The nanowires with diameters greater than ~90 nm resulted in more uniform nanoparticle sizes after annealing. Furthermore, the nanoparticle size tended to stabilize at moderate annealing conditions and with larger diameters of nanowires. The formation of larger-sized faceted nanoparticles was also enhanced in longer annealing durations (6-10 hrs) and under these conditions smaller nanowire diameters (<73 nm) were observed (Table 3).

Several factors can be responsible for the morphological evolution of $Co_3O_4$ on CuO nanowires in this study. These competing mechanisms include Ostwald's ripening, thermodynamic imbalance, surface tension, surface charge, and stresses in the evolving $Co_3O_4$ morphologies. All these could explain the larger size and faceting of the nanoparticles with increasing annealing durations. In addition, the self-diffusion of Co (order of $10^{-5}$ $cm^2/sec$) and $Co_3O_4$ (order of $10^{-12}$ $cm^2/sec$) was negligibly small (Noh, J. S.; Lee, M. K.; Ham, J.; Lee, W. *Nanoscale Res. Lett.* 2011, 6, 598; Kingery, W. D.; Bowen H. K.; Uhlmann D. R. *Introduction to Ceramics*; Wiley: New York, 1997) at the annealing temperatures herein. In regard to thermodynamic imbalance, solid aggregate vapor pressure of $Co_3O_4$ around each nanowire increases with annealing duration, which resulted in non-zero Gibb's free energy ($\Delta G$), resulted in a change in surface energy of $Co_3O_4$, and led to the faceted growth of $Co_3O_4$ nanoparticles (Shi, W.; Chopra, N. *J. Nanopart Res.* 2011, 13, 851-868). The particle size further increased with the annealing durations due to the intensified Ostwald's ripening effect. All these combined with chemical potential gradient (Shi, W.; Chopra, N. *J. Nanopart Res.* 2011, 13, 851-868), the process facilitated material migration from nanowires (high curvature) towards the base (low curvature) or flat nanowire tips and resulted in tapered shape and material accumulation at the nanowire tip (bulb-shape morphology, FIG. 15$h$). This caused the slight decrease in diameters of nanowires for longer annealing durations. The chemical potential gradient accounts for the stress on the oxidizing Co film (Hill, J. J.; Banks, N.; Haller, K.; Orazem, M. E.; Ziegler, K. J. *Nano Lett.* 2011, 133, 18663-18672), affecting the morphological evolution of $Co_3O_4$ on CuO nanowires. On the other hand, the surface charge of $Co_3O_4$ is strongly dependent on the surface energy and oxygen content in the annealing environment (Shi, W.; Chopra, N. *J. Nanopart Res.* 2011, 13, 851-868). With increasing annealing duration, greater $Co_3O_4$ content and faceted nanoparticles are formed in these nanowire heterostructures, which implies greater electrostatic repulsion for the $Co_3O_4$ grains due to surface charging. Finally, lattice compatibility at the interface of CuO and $Co_3O_4$ cannot be ruled out (Shi, W.; Chopra, N. *J. Nanopart Res.* 2011, 13, 851-868; Cao, et al., *Nano Lett,* 2006, 6, 1852-1857).

Figure 12:
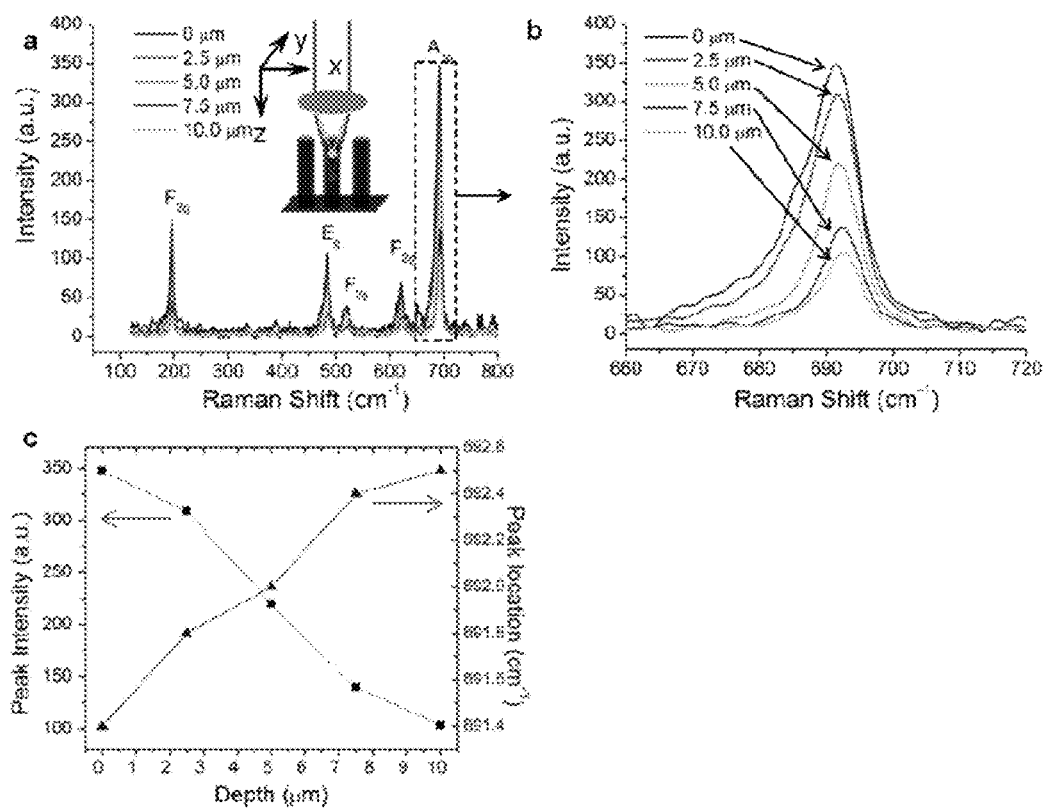
FIG. 12(a) are Raman spectra collected at different depths of standing $CuO$—$Co_3O_4$ nanowire heterostructures (sample #3B, Table 1) using Raman depth profiling method.
FIG. 12(b) is a comparison of $Co_3O_4$ A1g Raman peak (centered at ~692 $cm^{-1}$)
FIG. 12(c) is a comparison of $Co_3O_4$ A1g Raman peak intensity and locations.
Figure 17:
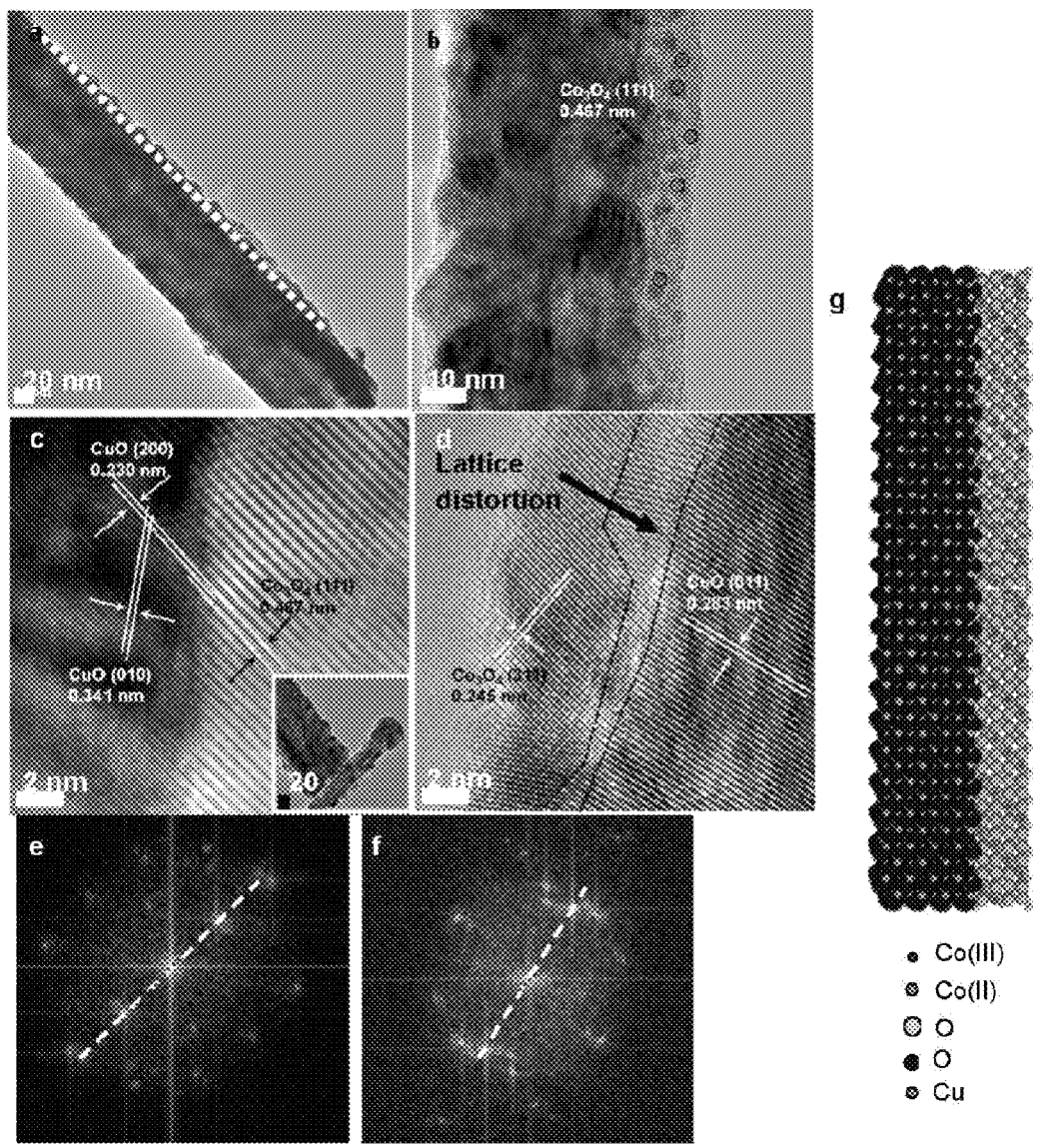
FIG. 17(a, b) are TEM images of sample #7B (5 min sputtering, 5 min annealing). (c, d) TEM images of sample #8B (5 min sputtering, 10 min annealing).

In regard to interfaces, $CuO-Co_3O_4$ nanowire heterostructure that were prepared after short air annealing durations (<10 min) were analyzed (FIG. 17). A good lattice match between the CuO and $Co_3O_4$ was observed at the interface. The lattice of monoclinic CuO nanowires with (200) planes matched well with lattice of (111) planes of spinel $Co_3O_4$ (FIG. 12$c$ and $g$) (Shi, W.; Chopra, N. *J. Nanopart Res.* 2011, 13, 851-868). Moreover for planes other than these, certain extent of lattice mismatch or distortion was observed at the interface (FIG. 12$d$). This is further confirmed by FFT image (FIGS. 12$e$-$f$), where the dotted lines connecting diametrically opposite indices correspond to CuO (white) and $Co_3O_4$ (red). It has been observed earlier that as soon as a good lattice match is established during the annealing process, the surface migration of $Co_3O_4$ on CuO nanowires is severely limited and could be the reason for uniform $Co_3O_4$ coating (Shi, W.; Chopra, N. *J. Nanopart Res.* 2011, 13, 851-868).

To demonstrate that the nanowires were coated uniformly with $Co_3O_4$ and this shell is polycrystalline, the core CuO nanowires (using sample #3B, Table 1) were selectively etched in a dilute acid. This resulted in polycrystalline nanotubes of $Co_3O_4$ (FIG. 18).

Figure 18:
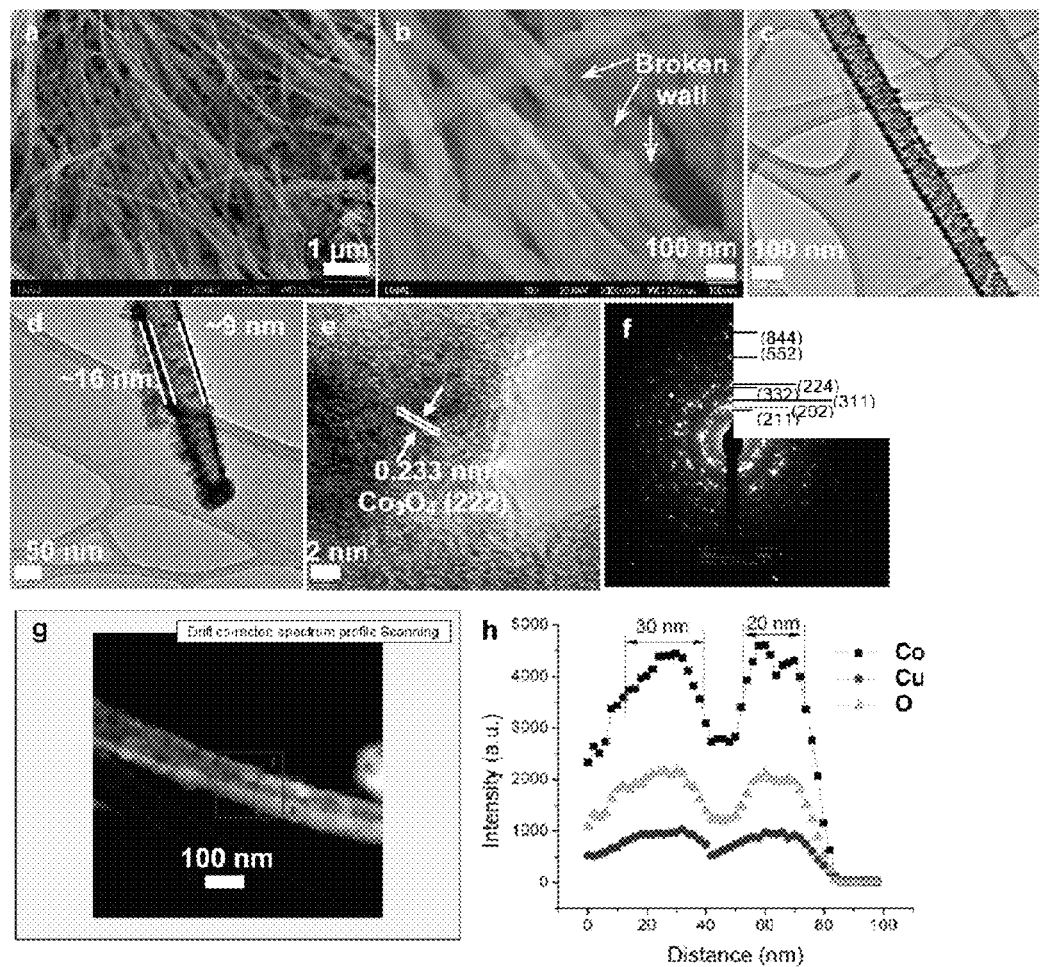
FIG. 18(a, b) are SEM, FIG. 18(c, d, e) are TEM images.
Figure 19:
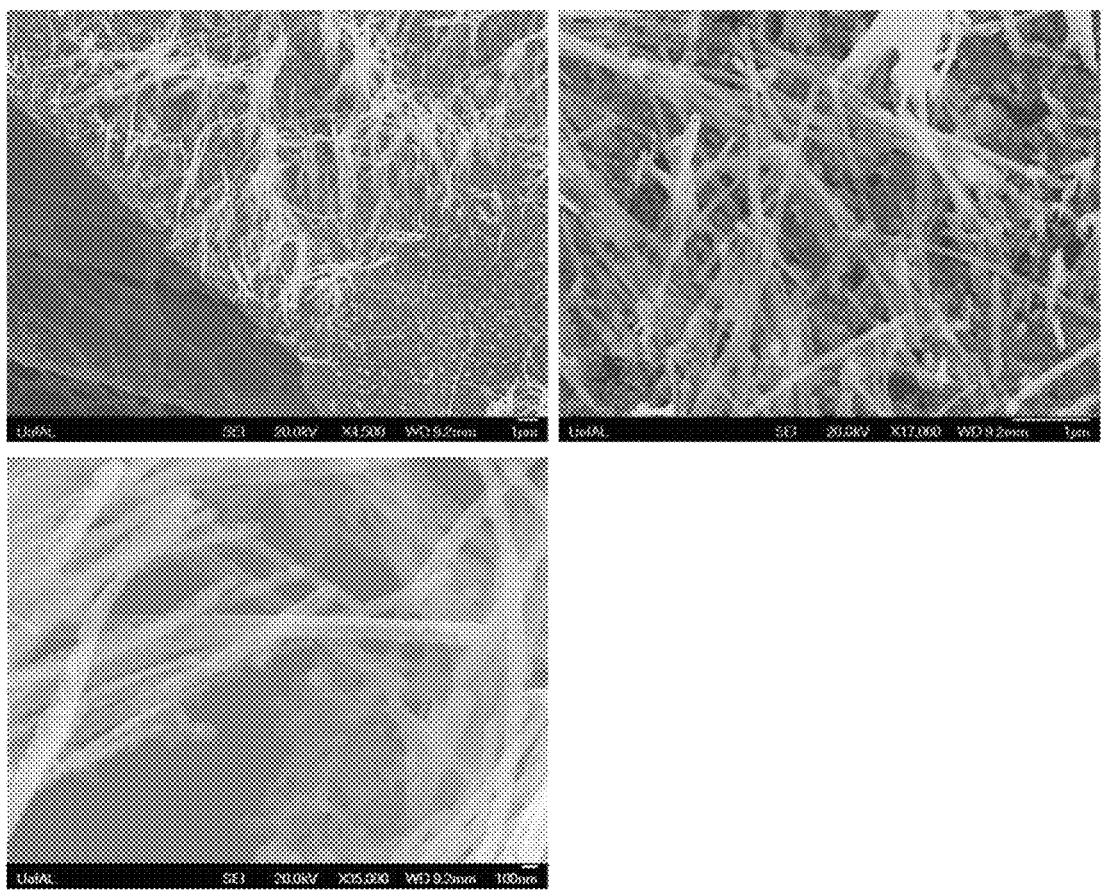
FIG. 19 contains SEM images of $Co_3O_4$ nanotubes after selective etching of CuO nanowires. The nanotubes are anchored onto the substrate even after the core CuO nanowire etching. Some nanotubes are broken along their lengths.

However, several of these nanotubes were broken (grain detachment) at multiple locations along the length (arrows in FIG. 18$b$). This could be due to the non-specific etching, imperfect packing of the coated $Co_3O_4$ shell, and high centrifuge speed (~6000 rpm) during the cleaning process. The average diameter of the $Co_3O_4$ (~113.5±23.3 nm) nanotubes was not significantly different from the $CuO-Co_3O_4$ nanowire heterostructures (~117.8±19.3 nm, sample #3B, Table 1). This confirms that there were negligible stresses within the $Co_3O_4$ coating on the CuO nanowires because otherwise, after the selective removal of core CuO nanowires, $Co_3O_4$ nanotubes would have had a significant diameter reduction or structural collapse. The majority of nanotubes remained anchored to the base substrate but bundled near the tip region due to capillary action and drying of the etchant solution (FIG. 19). The shadowing effect by virtue of line-of-sight Co sputter deposition could be clearly seen in the $Co_3O_4$ nanotubes, where the shell thickness difference between ~5-7 nm was observed (FIG. 18$d$). Various crystal planes were observed (FIGS. 18$e$, $f$) for polycrystalline nanotubes with none corresponding to CuO. However, high-angle dark-field scanning transmission electron microscopy (HADDF-STEM) mode EDS line profiles (0.1 nm probe size) showed minor copper signal indicating that there was negligible CuO left at the inner walls of the nanotubes (FIGS. 18$g$, $h$). Pure and polycrystalline $Co_3O_4$ nanotubes would be obtained, if the etching process and conditions were precisely controlled.

TABLE 2

An example data set showing $CuO-Co_3O_4$ nanowire heterostructures diameter as a function of annealing duration and corresponding $Co_3O_4$ projection area as indicated in FIG. 15j and k.

| Diameter of nanowires (nm) | Annealing duration | Projection area (nm$^2$) |
|---|---|---|
| 46.97 | 5 min | 860 |
| 46.97 | 5 min | 761.5 |
| 48.42 | 5 min | 1557 |
| 48.42 | 5 min | 1298 |
| 85.98 | 10 min | 5234 |
| 58.01 | 10 min | 5597.9 |
| 63.58 | 20 min | 12157 |
| 64.08 | 20 min | 9543 |
| 73.86 | 20 min | 6583 |
| 75.23 | 20 min | 5412 |
| 54.46 | 60 min | 10510 |
| 58.17 | 60 min | 4620 |
| 66.1 | 60 min | 4104 |
| 55.4 | 2.5 h | 13362 |
| 61.78 | 2.5 h | 10807 |
| 66.76 | 2.5 h | 8728 |
| 83.82 | 2.5 h | 8531.6 |
| 56.16 | 5 h | 17384 |
| 59.35 | 5 h | 15316 |
| 77.46 | 5 h | 7521 |
| 75.48 | 7.5 h | 24940 |
| 81.96 | 7.5 h | 19982 |
| 140 | 7.5 h | 17766 |
| 67 | 10 h | 21885 |
| 79.5 | 10 h | 21750 |
| 86.12 | 10 h | 13425 |

TABLE 3

Average diameter and standard deviation of $CuO-Co_3O_4$ nanowire heterostructures for different annealing durations.

| Time (min) | Average Diameter (nm) | Standard Deviation (nm) |
|---|---|---|
| 5 | 77.11 | 12.19 |
| 10 | 71.7 | 12.06 |
| 20 | 73.82 | 13.99 |
| 60 | 72.05 | 12.71 |
| 150 | 73.43 | 10.7 |
| 300 | 72.59 | 21.7 |
| 450 | 73.56 | 9.11 |
| 600 | 71.89 | 10.93 |

Band Gap Energy and Phenol Photodegradation Studies Using $CuO-Co_3O_4$ Nanowire Heterostructures as Photocatalysts The effects of morphology of $CuO-Co_3O_4$ nanowire heterostructures (Sample #1B-6B, Table 1) on their UV absorption characteristics and band gap energies were evaluated. Multiple absorption edges for the as-produced CuO nanowires (Shi, W.; Chopra, N. *J. Nanopart Res.* 2011, 13, 851-868) and CuO—$Co_3O_4$ nanowire heterostructures were observed (FIG. 20a). Considering them as indirect band gap semiconductors, spectra were converted into Tauc plots (FIGS. 21b-h) (Shi, W.; Chopra, N. *J. Nanopart Res.* 2011, 13, 851-868; Tunc, et al., *Surf. Interface Anal.* 2010, 42, 835-841), where intercepts of the extrapolated linear region(s) on x axis corresponds to the band gap energy. The band gap tailing was observed due to the morphology and quantum confinement effects (Grimes, et al., *Light, water, and hydrogen: The solar generation of hydrogen by water photoelectrolysis*; Springer: New York, 2008; Shi, W.; Chopra, N. *J. Nanopart Res.* 2011, 13, 851-868) The as-produced CuO nanowires exhibited a band gap of ~1.6 eV with a tailing of ~1.25 eV. However, careful analysis of absorbance of CuO nanowires also showed edges centered on ~280 nm, ~390 nm, and ~500 nm (FIG. 21a) (Shi, W.; Chopra, N. *J. Nanopart Res.* 2011, 13, 851-868). The former two edges were attributed to the presence of CuO and $Cu_2O$ thin films, which emerged by virtue of the VS growth mechanism for CuO nanowires (Jiang, X.; Herricks, T.; Xia, Y. *Nano Lett.* 2002, 2, 1333-1338; Chopra, N.; Hu, B.; Hinds, B. J. *J. Mater. Res.* 2007, 22, 2691-2699).

Figure 21:
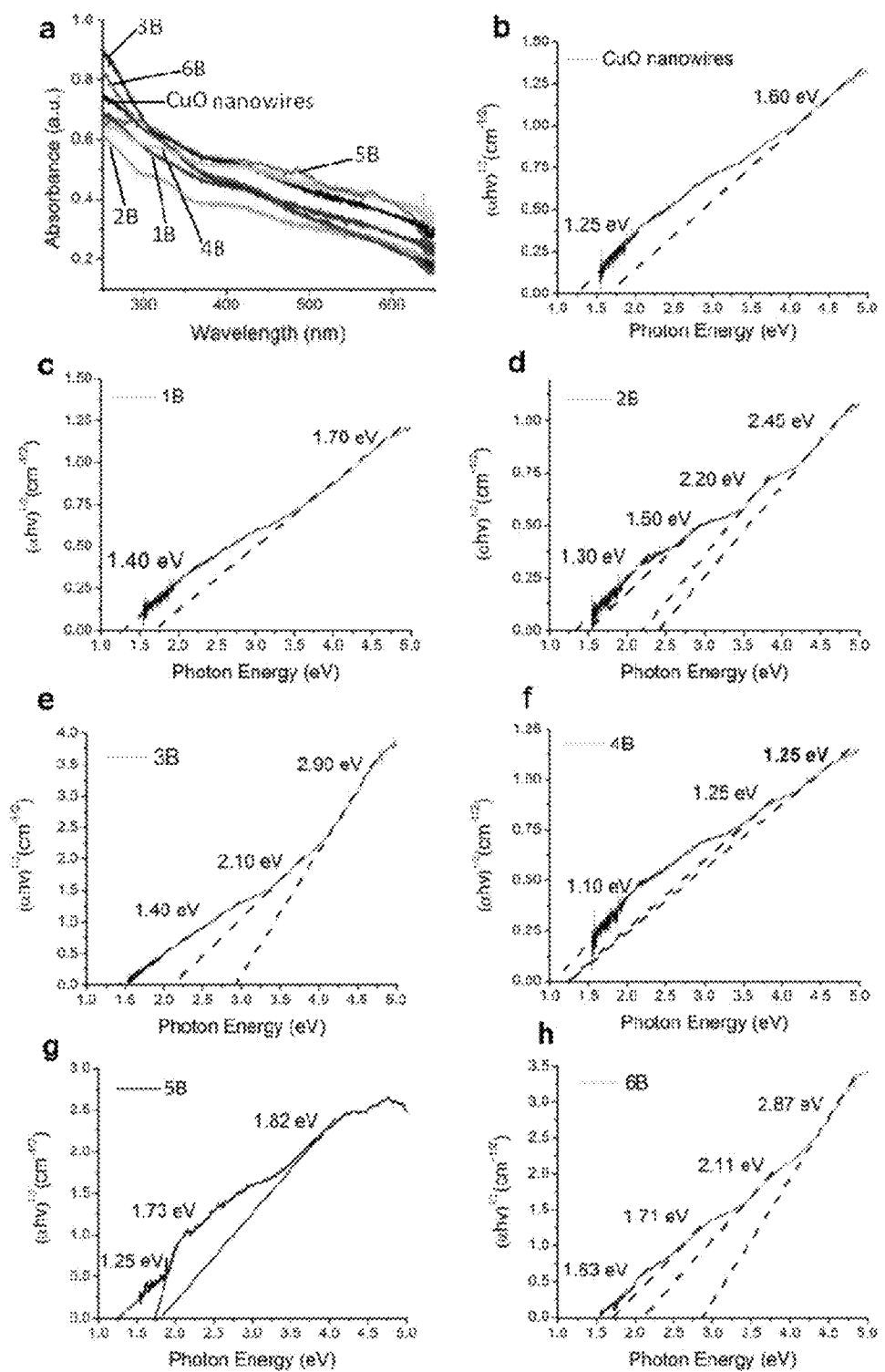
FIG. 21(b-h) are Tauc plots indicating band gap energies and tailing for the as-prepared CuO nanowires and samples #1B-6B. Sample fabrication details are given in Table 1.

Nanowire heterostructures exhibited band gap energies ranging from 1.1 eV-3.0 eV (FIGS. 21b-g) (Anandan, S.; Wen, X.; Yang, S. *Mater. Chem. Phys.* 2005, 93, 35-40), whereas bulk CuO and $Co_3O_4$ systems have band gap energies of ~1.5 eV, and 2.0 eV, respectively, without any band gap tailing (Gu, F.; Li C.; Hu Y.; Zhang L. *J. Cryst. Growth* 2007, 304, 369-373). Absorbance vs. wavelength plots showed the development of new absorption edges in UV and visible range for each of the nanowire heterostructures sample (FIG. 21a). Amongst all the samples, strongest edges emerged in samples #4B and #2B, with $Co_3O_4$ as polycrystalline shell (FIG. 13d) in the former and nanoparticles embedded in thin film in the latter (FIGS. 13b and 15h). Interestingly, sample #2B exhibited more discrete band gap tailing (FIGS. 21c-d) as compared to polycrystalline shell morphologies (FIGS. 21d-h). The former could also be attributed to interfacial charge transfer processes associated with $O^{2-}$ to $Co^{2+}$ or $Co^{3+}$ transitions coupled with core CuO nanowires (Shi, W.; Chopra, N. *J. Nanopart Res.* 2011, 13, 851-868; Barreca, et al., *Chem. Mater.* 2001, 13, 588-593). Overall, the shift of absorption edges as compared to bulk $Co_3O_4$ edges was observed due to heterostructuring and nanostructuring, morphology of $Co_3O_4$, and interfacial relationships between the core nanowire and the coated $Co_3O_4$ (Shi, W.; Chopra, N. *J. Nanopart Res.* 2011, 13, 851-868; Long, et al., *J. Phys. Chem. B* 2006, 110, 20211-20216). It is anticipated that these nanowire heterostructures will be multi-wavelength photoactive from UV to visible range.

Figure 20:
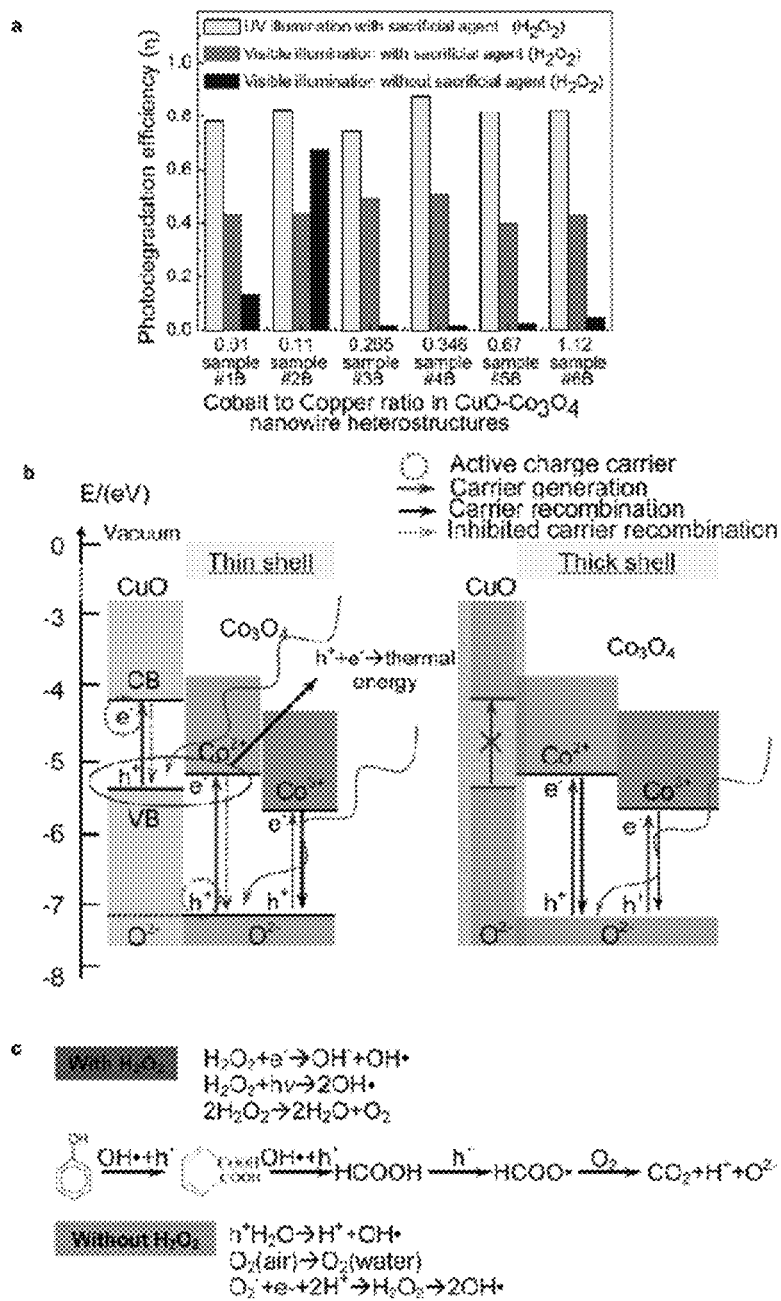
FIG. 20(a) is a comparison of phenol photodegradation efficiency (η) for different samples and reaction conditions.
FIG. 20(b) is a schematic illustration of band gap energies of $CuO$—$Co_3O_4$ nanowire heterostructures and the proposed charge transfer or separation mechanism.
FIG. 20(c) is a possible chemical reactions for photodegradation with and without $H_2O_2$. The schematic in FIG. 20(b) on the left corresponds to sample #2B and on the right is consistent with sample #4B.
Figure 22:
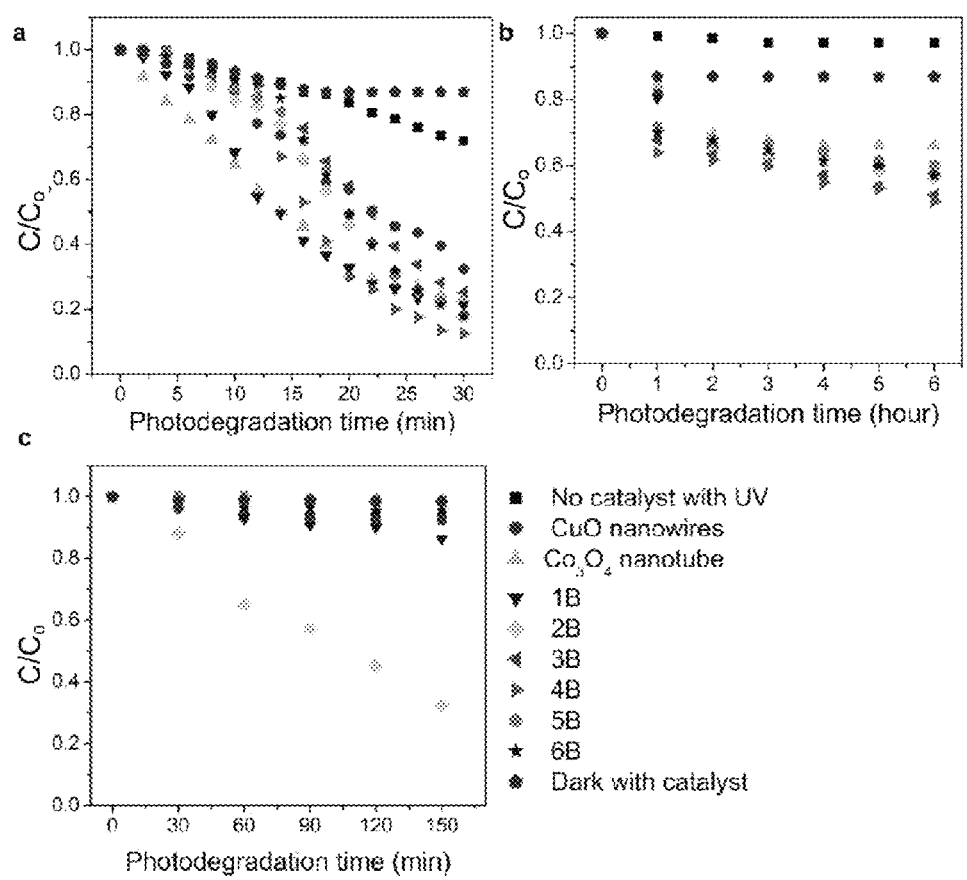
FIG. 22 shows the phenol photodegradation (conversion ratio) using $CuO$—$Co_3O_4$ nanowire heterostructures (Sample 1B-6B, Table 1) as a function of reaction time under (a) UV illumination (λ~254 nm) and a sacrificial agent ($H_2O_2$), FIG. 22(b) visible light illumination (λ~580 nm) and $H_2O_2$, and FIG. 22(c) visible light illumination (λ~580 nm) and without $H_2O_2$.
Figure 23:
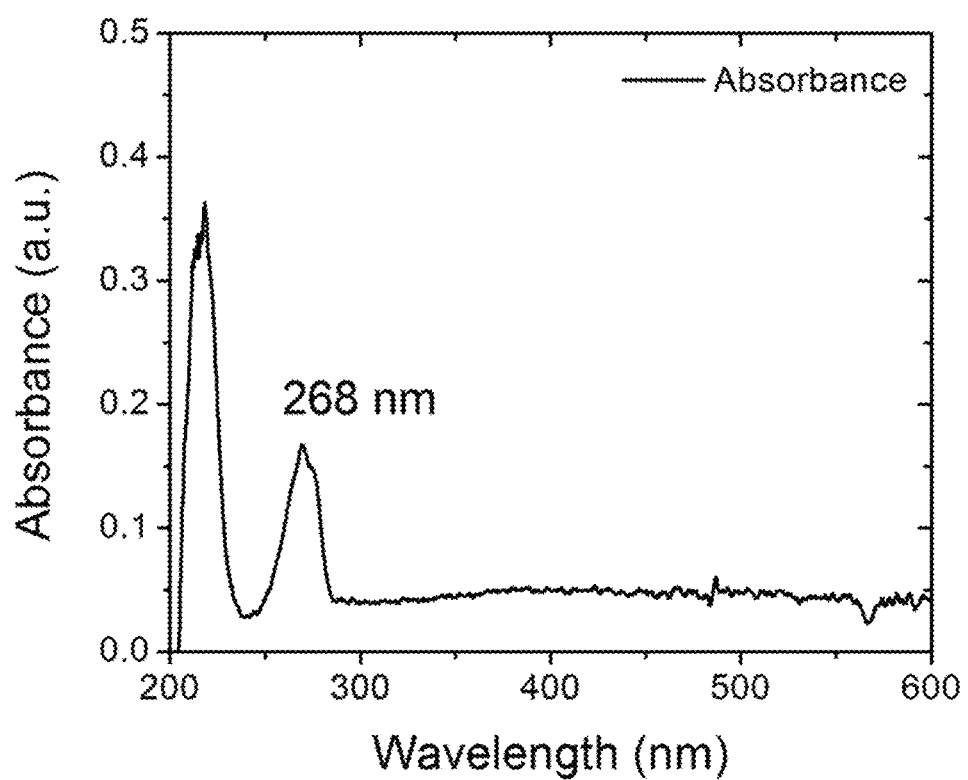
FIG. 23 is a representative UV-vis spectrum for phenol in DI water. The peak that was considered for all the degradation studies is marked at 268 nm.

Phenol photodegradation in water using UV and visible light was conducted for the nanowire heterostructures (Samples #1B-6B, Table 1), as-produced CuO nanowires, and $Co_3O_4$ nanotubes (FIG. 22). The characteristic UV absorption peak for phenol is shown in FIG. 23. The experiments were divided into three different sets based on illumination and degradation conditions: 1) under UV light ($\lambda$~254 nm) with sacrificial agent ($H_2O_2$), 2) under visible light ($\lambda$~580 nm) with $H_2O_2$, and 3) under visible light ($\lambda$~580 nm) without $H_2O_2$. Four kinds of control experiments for photodegradation of phenol were performed: a) with catalyst (CuO nanowires) in dark and with or without $H_2O_2$, b) without any catalyst in UV light and with $H_2O_2$, c) without any catalyst in visible light and with or without $H_2O_2$, and d) with $Co_3O_4$ nanotubes under UV or visible light and with or without $H_2O_2$. Highest photodegradation efficiencies ($\eta$) were observed for UV illumination and in presence of $H_2O_2$ (FIG. 20 and Table 4). The photodegradation was observed to be rapid in case of UV illumination with $H_2O_2$ (FIG. 22a) and slowest in visible light illumination with or without $H_2O_2$ (FIGS. 22b-c). This is also consistent with the absorbance behavior of the samples, which showed greater activity in UV region than in visible. Under UV illumination, phenol degradation without catalyst but with $H_2O_2$ was ~10 times higher ($\eta$~28.1%) than in the case of visible light with or without $H_2O_2$ (Table 4). Without illumination and using CuO nanowires as catalysts, $\eta$ was ~13%, in presence of $H_2O_2$ and was ~1.5% in the absence of $H_2O_2$, which indicates that phenol can self-degrade in the dark with the aid of $H_2O_2$. Using CuO nanowires as photocatalysts, it was possible to obtain $\eta$~67.6%, ~42.8%, and ~8.9% with UV illumination and $H_2O_2$, visible illumination and $H_2O_2$, and visible illumination without $H_2O_2$, respectively. In regard to $Co_3O_4$ nanotubes, these efficiencies (Table 4) were increased (76.6%) in case of UV illumination with $H_2O_2$ degradation but decreased (~33.9%) for visible illumination with $H_2O_2$, and further to ~2.2% for visible illumination without $H_2O_2$. Thus, $Co_3O_4$ alone has low photodegradation ability in visible light and necessitates a sacrificial agent to achieve higher $\eta$.

CuO—$Co_3O_4$ nanowire heterostructures showed improved $\eta$ as compared to control samples (FIGS. 22a-c). For UV illumination with $H_2O_2$, $\eta$ was greater than ~75% for all the samples during 30 min of degradation reaction, implying that the heterostructures' photodegradation performance is better under these conditions. Sample #4B showed highest $\eta$ (~87%) for UV illumination with $H_2O_2$, and this trend was followed ($\eta$~50.8%) in visible illumination with $H_2O_2$. Notably, visible illumination without $H_2O_2$ showed anomalous photodegradation behavior for sample #2B ($\eta$~69.6%) as compared to the other samples, where $\eta$ never surpassed ~14% (Table 4). Sample #4B showed significantly low $\eta$ (~1.6%) without $H_2O_2$, which indicated a strong dependence of the performance on the presence of $H_2O_2$. The dependence of $\eta$ on the Co content is shown in FIG. 20a, which also suggests that controlled nanowire heterostructure morphology can result in simple and non-contaminated photodegradation scheme that could completely eliminate the need of a sacrificial agent.

A thick polycrystalline shell of $Co_3O_4$ on CuO nanowires made the latter optically opaque to incident light and resulted in charge transfer processes dominated by $Co_3O_4$. The visible light may not provide enough energy for suppressing the charge recombination and scattering due to $Co_3O_4$ shell thickness/polycrystallinity and could be the reason for the need of a sacrificial agent ($H_2O_2$) to achieve higher $\eta$ for sample #4B. On the other hand, when the $Co_3O_4$ shell was very thin with nanoparticles embedded within, the core CuO nanowires were also photoactive and led to a rapid charge transfer at the interface with $Co_3O_4$. Thus, with active interfaces, the sample #2B is excited with visible light without $H_2O_2$ and resulted in charge carrier generation with less scattering and rapid separation, both responsible for higher $\eta$ (~67.5%). However, this $\eta$ was still lower than when the UV illumination was supplemented with $H_2O_2$. The band gap diagrams and electron-hole separation and recombination in both the components (CuO and $Co_3O_4$) were analyzed. Considering that CuO has an average band gap energy of ~1.35 eV, it could exhibit transitions from valence band and/or from $O^{2-}$ band to conduction band. The latter is consistent with band gap energy of ~3.25 eV (Koffyberg, F. P.; Benko, F. A. *J. Appl. Phys.* 1982, 53, 1173-1177). For $Co_3O_4$, transitions from $O^{2-}$ to $Co^{3+}$ and/or $Co^{2+}$ are known with average band gaps of ~1.5 eV and ~2.0 eV (Gu, et al., *J. Cryst. Growth* 2007, 304, 369-373). By aligning the $O^{2-}$ band edge in CuO and $Co_3O_4$, relative band edge positions of CuO and $Co_3O_4$ were determined and a combined band energy diagram for CuO—$Co_3O_4$ nanowire heterostructures was derived in FIG. 20*b*.

The interaction of semiconducting oxide components under illumination and $H_2O_2$ generated electron-hole pairs which assisted in carrying out phenol photodegradation (FIG. 20*c*). These electrons and holes have a greater tendency to combine rather than participate in photochemical reaction in case of thick polycrystalline $Co_3O_4$ shell necessitating the use of $H_2O_2$ to achieve phenol photodegradation (FIG. 20*b*, schematic on the right). It is proposed here that $O^{2-}$ to $Co^{2+}/CO^{3+}$ transitions were more dominant in samples with thick polycrystalline $Co_3O_4$ shell. This is also true as it was observed that $Co_3O_4$ nanotubes showed comparable photocatalytic efficiencies with sample #4B (Table 4). On the other hand, the morphology of sample #2B has more active interfaces, where $O^{2-}$ to $Co^{2+}$ transitions and CuO photoactivity couple together to result in anomalously high η (FIG. 20*b*, schematic on the left). Since the conduction band of $Co_3O_4$ ($Co^{2+}$) is slightly higher than valence band of CuO, it is possible that, after illumination, this could effectively extend the life time of electrons in CuO and holes in $Co_3O_4$, which greatly increased the η.

Figure 24:
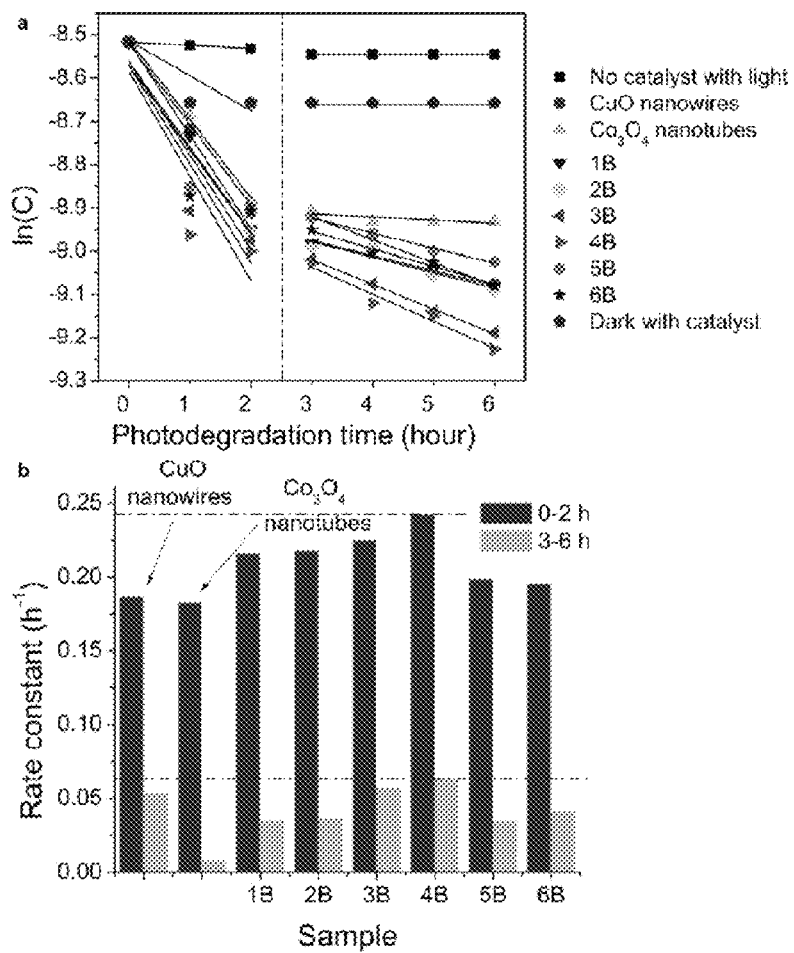
FIG. 24 shows a phenol photodegradation kinetics study.

The degradation conditions of visible light illumination with $H_2O_2$ were selected further for photodegradation kinetics (FIG. 24). A first order kinetics was observed as shown by linear relationship between ln C and t ('C' is the phenol concentration at time 't', FIG. 24*a* and Table 5) (Zhang, et al., *Appl. Catal. B Enviorn.* 1998, 15, 147-156). For control as well as nanowire heterostructure samples, the photodegradation process was much faster (~20 to 50 times, FIG. 24*b*) in the first 2 hrs and slowed down for the next 4 hrs. Considering only a small amount (0.02 mM, 12 µL) of sacrificial agent ($H_2O_2$) was added, the sharp decrease resulted from the depletion of $H_2O_2$, which assisted in absorbing photogenerated electrons and suppressed the recombination process (Cornish, B. J. P. A.; Lawton, L. A.; Robertson, P. K. J. *Appl. Catal. A* 2000, 25, 59-67). Thus, it is necessary to divide the photodegradation process under these conditions into two parts; one between 0 to 2 hrs and other between 3 to 6 hrs. The region between 2 to 3 hrs could be considered as the transition zone, where $H_2O_2$ is nearly finished. The rate constants of reactions using different photocatalysts were compared in FIG. 24*b* and showed that the nanowire heterostructures displayed better performance (with sample #4B ranking highest) than individual components (CuO nanowires and $Co_3O_4$ nanotubes).

TABLE 4

Efficiencies (η) of phenol photodegradation corresponding to illumination source, degradation conditions, and type of photocatalyst. The phenol concentration for the photodegradation experiments performed in presence of $H_2O_2$ (sacrificial agent) was 0.2 mM and without $H_2O_2$ was 0.1 mM. It is to be noted that catalyst amount to phenol volume ratio was maintained constant for all the experiments (~1 g/L).

| Sample | UV light with $H_2O_2$ | | Visible light with $H_2O_2$ | | Visible light without $H_2O_2$ | |
| --- | --- | --- | --- | --- | --- | --- |
| | Efficiency | Normalized Efficiency | Efficiency | Normalized Efficiency | Efficiency | Normalized Efficiency |
| No catalyst with UV | 0.281 | 0.321 | 0.028 | 0.055 | 0.063 | 0.093 |
| CuO nanowire | 0.677 | 0.774 | 0.428 | 0.843 | 0.075 | 0.111 |
| $Co_3O_4$ nanotube | 0.766 | 0.875 | 0.339 | 0.667 | 0.008 | 0.011 |
| 1B | 0.786 | 0.898 | 0.433 | 0.852 | 0.136 | 0.202 |
| 2B | 0.827 | 0.945 | 0.436 | 0.858 | 0.675 | 1.000 |
| 3B | 0.747 | 0.854 | 0.489 | 0.963 | 0.016 | 0.023 |
| 4B | 0.875 | 1.000 | 0.508 | 1.000 | 0.016 | 0.024 |
| 5B | 0.818 | 0.935 | 0.398 | 0.783 | 0.023 | 0.034 |
| 6B | 0.822 | 0.939 | 0.43 | 0.846 | 0.045 | 0.066 |
| Dark with catalyst (CuO nanowire) | 0.13 | 0.149 | 0.13 | 0.256 | 0.015 | 0.022 |

TABLE 5

Data set showing the fitted equations for the photodegradation kinetics corresponding to different photocatalysts and control conditions. First order chemical reaction kinetics is observed here.

| | 0~2 hours | | 3~6 hours | |
| --- | --- | --- | --- | --- |
| Sample | Fitted equation | $R^2$ | Fitted equation | $R^2$ |
| No catalyst with UV | y = −0.01x − 8.52 | 1.000 | y = −8.54 | 1.000 |
| CuO nanowire | y = −0.19x − 8.52 | 0.997 | y = −0.053x − 8.76 | 0.978 |
| $Co_3O_4$ nanotube | y = −0.18x − 8.51 | 0.996 | y = −0.007x − 8.89 | 0.400 |
| 1B | y = −0.22x − 8.52 | 1.000 | y = −0.035x − 8.871 | 0.957 |
| 2B | y = −0.22x − 8.56 | 0.786 | y = −.036x − 8.870 | 0.847 |
| 3B | y = −0.23x − 8.57 | 0.717 | y = −0.057x − 8.847 | 0.995 |
| 4B | y = −0.24x − 8.58 | 0.617 | y = −0.063 − 8.849 | 0.950 |
| 5B | y = −0.20x − 8.56 | 0.733 | y = −0.035x − 8.820 | 0.987 |
| 6B | y = −0.19 − 8.57 | 0.631 | y = −0.041 − 8.832 | 0.965 |
| Dark with catalyst | y = −0.08x − 8.52 | 0.993 | y = −8.56 | 1.000 |

Other advantages which are obvious and which are inherent to the invention will be evident to one skilled in the art.

It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of forming metal oxide-metal oxide nanowires, comprising:
   a) heating a metal film to form metal oxide nanowires;
   b) depositing a second metal on the metal oxide nanowires, thereby forming coated nanowires; and
   c) thermally annealing the coated nanowires.

2. The method of claim 1, wherein the metal film is heated at a temperature of from 100° C. to 600° C.

3. The method of claim 1, wherein the metal film is heated for from 1 to 24 hours.

4. The method of claim 1, where in the metal film comprises a transition metal.

5. The method of claim 1, wherein the metal film comprises copper, iron, nickel, ruthenium, titanium, vanadium, manganese, cobalt, zinc, zirconium, rhodium or combinations thereof.

6. The method of claim 1, wherein the second metal comprises a transition metal.

7. The method of claim 1, wherein the second metal comprises copper, iron, nickel, ruthenium, titanium, vanadium, manganese, cobalt, zinc, zirconium, rhodium or combinations thereof.

8. The method of claim 1, where the thermal annealing temperature of the coated nanowires is from 100 to 1000° C.

9. The method of claim 1, wherein the coated nanowires are thermally annealed for from 1 minute to 24 hours.

10. The method of claim 1, wherein the coated nanowires are from 20 to 200 nm in diameter.

11. The method of claim 1, wherein the coated nanowires are from 40 to 150 nm in diameter.

12. A method of forming copper oxide-cobalt oxide nanowires, comprising:
   a) heating a copper film to form copper oxide nanowires;
   b) sputtering cobalt onto the copper oxide nanowires; and
   c) annealing the coated nanowires in air thereby forming copper oxide-cobalt oxide nanowires.

13. The method of claim 12, wherein the copper film is heated at a temperature of from 100 to 600° C.

14. The method of claim 12, wherein the copper film is heated for from 1 to 24 hours.

15. The method of claim 12, wherein the cobalt is sputtered for from 1 to 50 minutes.

16. The method of claim 12, wherein the cobalt coated copper oxide nanowires are thermally annealed at a temperature of from 100 to 1000° C.

17. The method of claim 12, wherein the cobalt coated copper oxide nanowires are thermally annealed for from 1 minute to 24 hours.

18. The method of claim 12, wherein the copper oxide-cobalt oxide nanowires are from 20 to 200 nm in diameter.

19. The method of claim 12, wherein the copper oxide-cobalt oxide nanowires are from 40 to 150 nm in diameter.

20. A photocatalyst comprising the copper oxide-cobalt oxide nanowires made by the method of claim 12.

* * * * *